US008789022B2

(12) United States Patent
Neogi

(10) Patent No.: US 8,789,022 B2
(45) Date of Patent: Jul. 22, 2014

(54) SELF-EVOLVING COMPUTING SERVICE TEMPLATE TRANSLATION

(75) Inventor: Atanu Neogi, Brookline, MA (US)

(73) Assignee: BMC Software, Inc., Houston, TX (US)

( * ) Notice: Subject to any disclaimer, the term of this patent is extended or adjusted under 35 U.S.C. 154(b) by 183 days.

(21) Appl. No.: 13/443,875

(22) Filed: Apr. 10, 2012

(65) Prior Publication Data

US 2013/0263091 A1 Oct. 3, 2013

Related U.S. Application Data

(60) Provisional application No. 61/618,761, filed on Mar. 31, 2012.

(51) Int. Cl.
*G06F 9/44* (2006.01)
*G06F 9/45* (2006.01)
*G06F 11/36* (2006.01)

(52) U.S. Cl.
CPC ........ *G06F 11/3668* (2013.01); *G06F 11/3608* (2013.01); *G06F 11/3604* (2013.01); *G06F 11/3688* (2013.01)
USPC ............ 717/126; 717/124; 717/136; 717/157

(58) Field of Classification Search
CPC ............ G06F 11/3668; G06F 11/3608; G06F 11/3604; G06F 11/3688; G06F 11/3684
See application file for complete search history.

(56) References Cited

U.S. PATENT DOCUMENTS

| | | | | |
|---|---|---|---|---|
| 6,772,413 B2 * | 8/2004 | Kuznetsov | ..................... | 717/136 |
| 8,397,217 B2 * | 3/2013 | Goryachev et al. | ........... | 717/124 |
| 8,453,117 B2 * | 5/2013 | Rajan et al. | ..................... | 717/126 |
| 8,549,479 B2 * | 10/2013 | Chavvakula et al. | ......... | 717/124 |
| 2003/0121026 A1 * | 6/2003 | Wang et al. | ..................... | 717/124 |
| 2004/0078787 A1 * | 4/2004 | Borek et al. | ................... | 717/136 |
| 2005/0235271 A1 * | 10/2005 | Sanyal et al. | ................. | 717/136 |
| 2005/0289517 A1 * | 12/2005 | Balfe et al. | ..................... | 717/126 |

(Continued)

FOREIGN PATENT DOCUMENTS

| | | |
|---|---|---|
| AU | 2013200199 A1 | 10/2013 |
| CA | 2802163 A1 | 9/2013 |
| EP | 2645247 A2 | 10/2013 |

OTHER PUBLICATIONS

Gregorio Diaz, Automatic Translation of WS-CDL Choreogrphics to Timed Automata, 2005, pp. 1-11.*

(Continued)

*Primary Examiner* — Thuy Dao
*Assistant Examiner* — Mongbao Nguyen
(74) *Attorney, Agent, or Firm* — Brake Hughes Bellermann LLP

(57) ABSTRACT

Methods and apparatus for automatically generating translation programs for translating computing services templates to service blueprints are disclosed. An example method includes generating a population of translation logic elements from a plurality of verified computing services template translation programs, where each of the verified programs is configured to correctly translate at least one computing services template of a plurality of known templates to a respective service blueprint. The example method further includes identifying a new computing services template and programmatically augmenting the population of translation logic elements. The example method also includes generating one or more additional translation programs based on the augmented population of translation logic elements and validating each of the one or more additional computing services template translation programs. Based on the validating, each of the one or more additional computing services template translation programs is added to the verified translation programs or is discarded.

20 Claims, 9 Drawing Sheets

(56) References Cited

U.S. PATENT DOCUMENTS

| | | | |
|---|---|---|---|
| 2006/0005179 A1* | 1/2006 | Kawahara et al. | 717/157 |
| 2007/0220586 A1 | 9/2007 | Salazar et al. | |
| 2008/0155520 A1* | 6/2008 | Meloche et al. | 717/157 |
| 2008/0295079 A1* | 11/2008 | Yiftachel et al. | 717/126 |
| 2011/0225568 A1* | 9/2011 | Rajan et al. | 717/126 |
| 2011/0321021 A1* | 12/2011 | Chen et al. | 717/157 |
| 2012/0147894 A1 | 6/2012 | Mulligan et al. | |

OTHER PUBLICATIONS

Dimitrios Georgakopoulos, Service-Oriented Computing, 2009, pp. 1-21.*

Vivek Kunda, Federal Cloud Computing Strategy, 2011, pp. 5-31.*

Patent Examination Report No. 1 issued by the Australian Patent Office on Dec. 3, 2013, for Australian Application No. 2013200199, 3 pages.

Notice of Acceptance for Australian Application No. 2013200199, mailed Feb. 28, 2014, 2 pages.

European Supplementary Search Report for European Application No. 13151738.5, dated May 2, 2014, 3 pages.

European Office Action for European Application No. 13151738.5, dated May 26, 2014, 5 pages.

* cited by examiner

SELF-EVOLVING COMPUTING SERVICE TEMPLATE TRANSLATION

CROSS-REFERENCE TO RELATED APPLICATIONS

This application claims the benefit under 35 U.S.C. §119(e) of U.S. Provisional Patent Application Ser. No. 61/618,761, filed on Mar. 31, 2012. The disclosure of U.S. Provisional Application Ser. No. 61/618,761 is incorporated by reference herein in its entirety.

TECHNICAL FIELD

The subject matter of the present disclosure relates, generally, to techniques for automatically generating translation programs for translating heterogeneous computer services templates to normalized service blueprints.

BACKGROUND

The growth in network-based computing, which is also often referred to as "cloud computing", has provided alternatives for designing and implementing computing resources, as compared with traditional approaches where a user (or entity) purchases hardware and software and then manages that hardware and software on an ongoing basis. Depending on the particular situation, such traditional approaches can be expensive, time-consuming and inefficient. For instance, hardware often becomes quickly obsolete, requiring periodic updates along with the associated time and expense of those updates. Additionally, for complex systems, keeping operating software (e.g., operating system software) and applications up-to-date and operating properly is expensive, time-consuming and often difficult to keep track of.

Network-based computing systems may be used to implement sets of computing resources for a user or set of users, such as for employees of a company, in a virtual manner. For instance, in certain implementations, a set of computing resources may be defined in a design template (also referred to herein as a "computing resources template" or "template"), where a given template represents a "live", or "runtime state" of a desired set of computing resources. Such templates, for a given computing system platform, may be used to generate a homogeneous, normalized service blueprint (e.g., in the form of a directed acyclic graph) that may then be used to virtually deploy the desired set of computing resources (e.g., a set of virtual machines, network components, firewalls, etc.) in an independently managed computing (e.g., hardware and software) network, where such a network is maintained by an independent service provider. In such approaches, users may then access the virtual deployed resources over a computing network, such as the Internet or other computer network (e.g., "over the cloud"). Accordingly, such approaches provide users access to desired computing resources, with essentially equivalent functionality as traditional approaches, while alleviating the need for ongoing management of computing hardware and/or software by the user, users and/or entity for which the resources are virtually implemented.

In such approaches, service blueprints are generally implemented as directed, acyclic graphs that illustrate a collection of computing nodes (e.g., virtual machines, databases, servers, etc.) and the relationships (e.g., edges) between those computing nodes in normalized manner. As indicated above, such service blueprints are translated from a corresponding service template that represents a runtime state of the computing resources. While such approaches provide a flexible approach for designing and deploying a given set of computing resources, they have some drawbacks. For instance, translation programs for translating templates to service blueprints are usually platform specific and are not extensible across different (heterogeneous) platforms. Specifically, virtually deploying computing resources in a given network-computing platform using such an approach may require a platform specific translation program (or set of translation programs), thus requiring separate design templates in order to deploy resources that are distributed across different types of platforms. Further, as new network-based computing platforms become available, new virtual computing resources are made available on a given platform and/or the semantics (e.g., design template semantics) used for a given platform change or are enhanced, the related translation programs must be re-engineered and/or new translation programs must be generated by software engineers, which, again, is expensive, time consuming and inefficient.

SUMMARY

In one general aspect, a computer-implemented method includes generating, by at least one processor, a population of translation logic elements from a plurality of verified computing services template translation programs, where each of the verified computing services template translation programs is configured to correctly translate at least one computing services template of a plurality of known computing services templates to a respective service blueprint. The computer-implemented method further includes identifying a new computing services template, programmatically augmenting the population of translation logic elements and generating one or more additional computing services template translation programs based on the augmented population of translation logic elements. The computer-implemented method also further includes validating each of the one or more additional computing services template translation programs. Based on the validating, the computer-implemented method includes performing, for each of the one or more additional computing services template translation programs, one of adding the additional translation program to the plurality of verified computing services template translation programs or discarding the additional translation program.

Implementations may include one or more of the following features. For example, generating the population of translation logic elements may include deconstructing the plurality of verified translation programs into a plurality of constituent decision trees, where each decision tree includes a plurality of operators and a corresponding plurality of operands. The plurality of operators may include a plurality of autonomous and sequential condition evaluation expressions and assignment expressions. The plurality of operands may include a plurality of resource identifiers and blueprint constructs. Each of the resource identifiers may correspond with a respective computing services template. Each of the blueprint constructs may be computing services template independent.

Programmatically augmenting the population of translation logic elements may include copying one or more of the translation logic elements and adding the one or more copies to the population of the translation logic elements, performing mutation of one or more of the translation logic elements of the population of translation logic elements, and performing crossover between two or more of the translation logic elements of the population of translation logic elements. Programmatically augmenting the population of translation logic elements may include recursively augmenting the population of translation logic elements.

Validating each of the one or more additional computing services template translation programs may include, for each of the additional computing services template translation programs, determining whether a service blueprint for the new computing services template that is generated by the respective additional translation program is semantically accurate and self-consistent. If the generated service blueprint is not semantically accurate and self-consistent, the respective additional translation program may be discarded. The generated service blueprint may be a directed graph.

Determining whether the generated service blueprint is semantically accurate and self-consistent may include (a) determining if the directed graph is acyclic; (b) determining, for each of one or more functional components represented in the directed graph, whether the respective functional component is associated with a single computing resource set, where each respective computing resource set may include at least one of respective computing specifications and respective network specifications; and (c) determining whether each of the at least one of respective computing specifications and respective network specifications are homogeneous.

Validating each of the one or more additional computing services template translation programs may include, for each semantically accurate and self-consistent service blueprint generated, determining whether the generated service blueprint corresponds, within a given degree of accuracy, with a runtime state of a computing services platform associated with the new computing services template. In the event the generated blueprint corresponds with the runtime state within the given degree of accuracy, the respective additional translation program may be added to the plurality of verified computing services template translation programs. In the event the generated blueprint does not correspond with the runtime state within the given degree of accuracy, the respective additional translation program may be discarded.

The generated service blueprint may comprise a directed graph and determining whether the generated blueprint corresponds with the runtime state within the given degree of accuracy may include, for each of one or more functional components represented in the directed graph, one or more of (a) comparing software of a corresponding functional component on the computing services platform with software indicated in the directed graph; (b) comparing an operating system of the corresponding functional component on the computing services platform with an operating system indicated in the directed graph; (c) comparing a network configuration of the corresponding functional component on the computing services platform with a network configuration indicated in the directed graph; (d) comparing a firewall configuration of the corresponding functional component on the computing services platform with a firewall configuration indicated in the directed graph; and (e) comparing a load balancer specification of the corresponding functional component on the computing services platform with a load balancer specification indicated in the directed graph.

Determining whether the generated blueprint corresponds with the runtime state within the given degree of accuracy may include determining a percentage of attributes of the computing services platform that correctly match attributes indicated in the directed graph based on the comparisons of the computing services platform with the directed graph for each functional component indicated in the directed graph.

The computer-implemented method, in the event each of the one or more additional translation programs are discarded, may include (a) programmatically further augmenting the population of translation logic elements; (b) generating one or more further additional computing services template translation programs based on the further augmented population of translation logic elements; (c) validating each of the one or more further additional computing services template translation programs; and (d) based on the validating of the one or more further additional computing services template translation program, performing, for each of the one or more further additional computing services template translation programs, one of adding the further additional translation program to the plurality of verified computing services template translation programs or discarding the further additional translation program.

Each of the known computing services templates and the new computing services template may include respective meta-data describing a configuration for a corresponding computing services platform. The new computing services template may be one of a modified version of one of the known computing services templates and a computing services template that was not previously included in the known service templates. The respective service blueprint may be a normalized, directed acyclic graph representing a design time state of a computing services platform associated with the respective computing services template, the directed acyclic graph may include a plurality of nodes and corresponding edges that define respective relationships between the plurality of nodes.

Programmatically augmenting the population of translation logic elements, generating the one or more additional computing services template translation programs and validating each of the one or more additional computing services template translation programs may be performed in accordance with one or more termination criteria.

In another general aspect, a non-transitory computer-readable storage medium has instructions stored thereon that, when executed, cause a processor to perform a process. The instructions include instructions to generate, by the at least one processor, a population of translation logic elements from a plurality of verified computing services template translation programs, wherein each of the verified computing services template translation programs is configured to correctly translate at least one computing services template of a plurality of known computing services templates to a respective service blueprint. The instructions further include instructions to identify a new computing services template, instructions to programmatically augment the population of translation logic elements and instructions to generate one or more additional computing services template translation programs based on the augmented population of translation logic elements. The instructions still further include instructions to validate each of the one or more additional computing services template translation programs, and, based on the validating, perform, for each of the one or more additional computing services template translation programs, one of adding the additional translation program to the plurality of verified computing services template translation programs or discarding the additional translation program.

Implementations may include one or more of the following features. For example, the instructions to programmatically augment the population of translation logic elements may include instructions to copy one or more of the translation logic elements and add the one or more copies to the population of the translation logic elements; perform mutation of one or more of the translation logic elements of the population of translation logic elements; and perform crossover between two or more of the of the translation logic elements of the population of translation logic elements. The instructions to programmatically augment the population of translation logic element may further include instructions to recursively augment the population of translation logic elements.

The instructions may further include, in the event each of the one or more additional translation programs are discarded, instructions to (a) programmatically further augment the population of translation logic elements; (b) generate one or more further additional computing services template translation programs based on the further augmented population of translation logic elements; and (c) validate each of the one or more further additional computing services template translation programs. Based on the validating of the one or more further additional computing services template translation programs, the instructions may perform, for each of the one or more further additional computing services template translation programs, one of adding the further additional translation program to the plurality of verified computing services template translation programs or discarding the additional translation program.

In another general aspect, a computer-implemented method includes generating, by at least one processor, a population of translation logic elements from a plurality of verified computing services template translation programs, where each of the verified computing services template translation programs is configured to correctly translate at least one computing services template of a plurality of known computing services templates to a respective service blueprint. The method further includes identifying a new computing services template. The method still further includes programmatically augmenting the population of translation logic elements by copying one or more of the translation logic elements and adding the one or more copies to the population of the translation logic elements; performing mutation of one or more of the translation logic elements of the population of translation logic elements; and performing crossover between two or more of the of the translation logic elements of the population of translation logic elements. The method still further includes generating one or more additional computing services template translation programs based on the augmented population of translation logic elements and validating each of the one or more additional computing services template translation programs. The method also includes, based on the validating, performing, for each of the one or more additional computing services template translation programs, one of adding the additional translation program to the plurality of verified computing services template translation programs or discarding the additional translation program.

Implementations may include one or more of the following features. For example, validating each of the one or more additional computing services template translation programs may include, for each of the additional computing services template translation programs, determining whether a service blueprint for the new computing services template generated by the respective additional translation program is semantically accurate and self-consistent. If the generated service blueprint is not semantically accurate and self-consistent, the respective additional translation program may be discarded. For each semantically accurate and self-consistent service blueprint generated, the method may include determining whether the generated service blueprint corresponds, within a given degree of accuracy, with a runtime state of a computing services platform associated with the new computing services template. In the event the generated blueprint corresponds with the runtime state within the given degree of accuracy, the respective additional translation program may be added to the plurality of verified computing services template translation programs. In the event the generated blueprint does not correspond with the runtime state within the given degree of accuracy, the respective additional translation program may be discarded.

The details of one or more implementations are set forth in the accompanying drawings and the description below. Other features will be apparent from the description and drawings, and from the claims.

DETAILED DESCRIPTION

Figure 1:
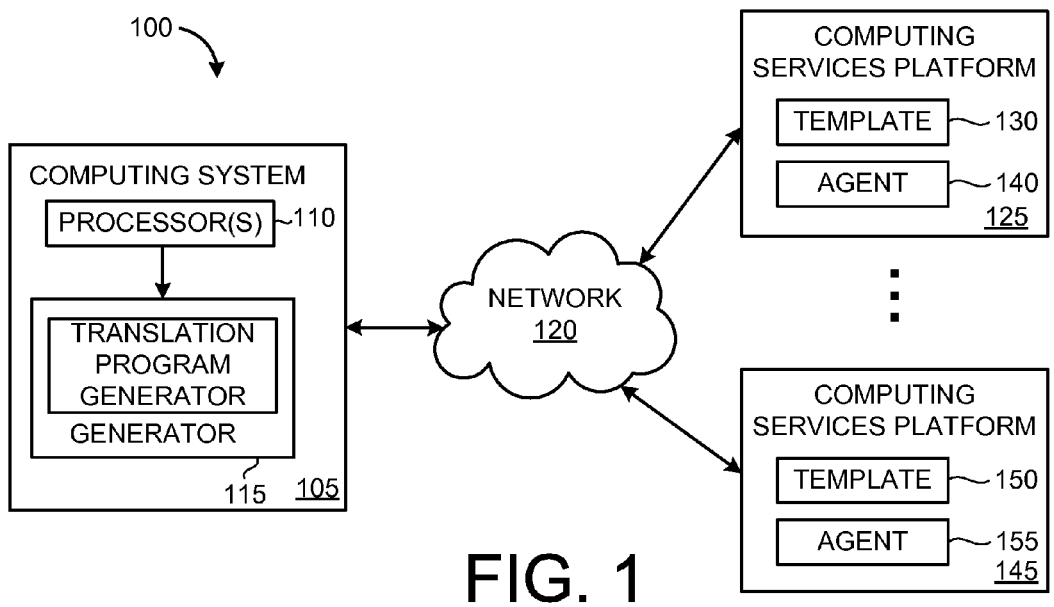
FIG. 1 is a block diagram illustrating a computing network in which a translation program generator is implemented according to an example implementation.

The claims and drawings recite and illustrate a number of methods and apparatus that may address, at least some of, the drawbacks of current approaches, such as those described above. In the following discussion, a description of approaches for implementing self-evolving computing service template translation programs, with general references to the drawings, is provided. Following this description, each of the drawings is individually discussed, so as to illustrate the example implementations shown in the drawings and provide an understanding of those implementations, as well as to provide further understanding of the general description.

Figure 2:
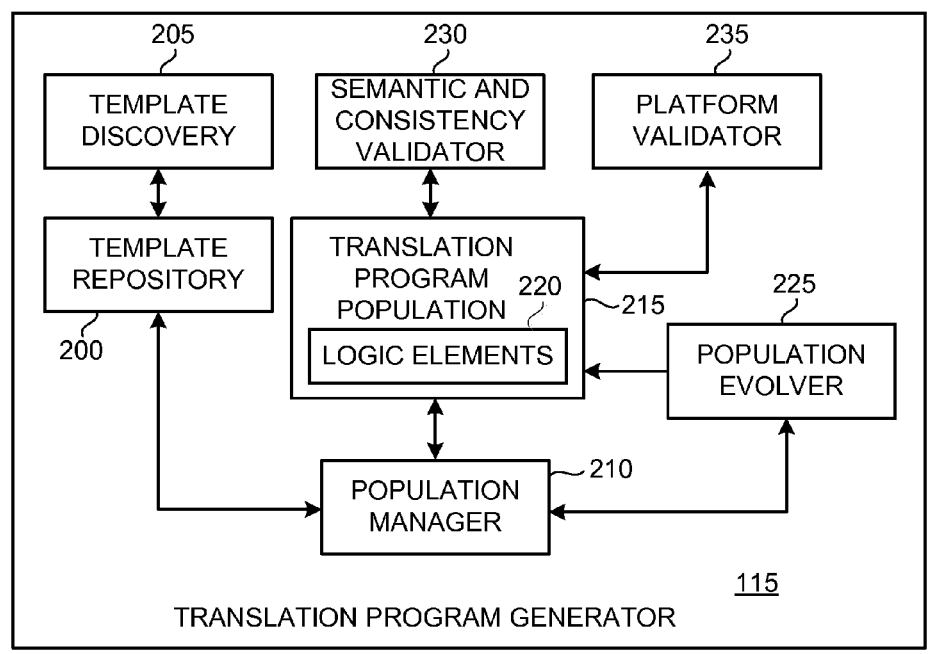
FIG. 2 is a block diagram illustrating a translation program generator according to an example implementation.

The implementations shown in the drawings, recited in the claims and described below may address the drawbacks of current approaches by implementing a generic (platform-neutral), self-correcting mechanism to generate (e.g., normalized) service blueprints from heterogeneous computing services platform design templates. Using such techniques, a set of translation programs implemented in a translation program generator apparatus, such as shown in FIGS. 1 and 2, may be self-correcting, such that service blueprints that are generated from heterogeneous design templates accurately represent respective runtime configurations of corresponding heterogeneous (e.g., network-based) computing services platforms using normalized constructs, so that computing services defined in those heterogeneous design templates can be managed in a repeatable, predictable and seamless manner. Implementations of such techniques may be accomplished by taking the following into consideration.

A first consideration that may be taken into consideration is that computing service platform providers may use platform specific (e.g., heterogeneous across different types of platforms) meta-data constructs as part of deploying computing resources (e.g., virtual machines (VMs) and software to a managed network "containment" target). As an example, VMware vCloud employs vApp Templates that can be provisioned to "Organization Networks" (orgNetworks) within an 'Organization Virtual Data Center' (orgVDC). As other examples, EC2, AWS AMIs or AWS Cloud Formation Templates may use Amazon Machine Images (AMIs) that can be provisioned to Availability Zones or to Subnets in Virtual Private Clouds (VPCs). Such heterogeneous metadata constructs are referred to herein as templates, design templates, computing services templates and/or computing services design templates.

Another consideration may be that a set of such templates across heterogeneous computing services platforms may be neither semantically consistent with each other, nor share any direct equivalence with a normalized set of service blueprint constructs. Moreover, even for a given computing services platform, the semantics of its templates may not be static, but may evolve with releases and new features of the associated platform.

Another consideration is that such templates are typically backed by respective concrete payloads (computing resources) that may be understood by the corresponding platform to be able to deploy software and VMs and to configure their inter-connectivity, as well as perform other actions. The runtime state of such a computing services platform can be normalized to a graph of normalized service blueprint constructs that are irrespective (independent) of the particular computing services platform (and/or its design template).

In view of the foregoing considerations, the following conclusions may be reached. A first conclusion is that there may be a pattern of meta-data (templates) that is applicable across a set of heterogeneous computing services platforms, even though the individual elements included in specific instances of such templates may be semantically different. Another conclusion is, the validation of a program that correctly translates (e.g., within an acceptable degree of accuracy) one such template may be established by its ability to accurately represent the runtime state of a set of virtual computing resources that results from deploying that template.

A further conclusion is, a program that generates a normalized service blueprint from such a template may essentially, and fundamentally, be a decision tree that introspects (e.g., examines) the structure of that template and creates a service blueprint using normalized constructs (elements) based on the template. An additional conclusion is that a set of such programs that (as a group) translates service templates into normalized service blueprints for a heterogeneous group of computing services platforms, as well as accounting for topological divergence within a given platform, may constitute a set of closely resembling, but not identical decision trees. Therefore, it may also further be concluded that a set of translation programs can be programmatically evolved by starting with an initial set of known decision trees that are verified to correctly generate normalized service blueprints for a set of known design templates. As part of verifying such translation programs, a fitness function for any such generated program may be computationally determined by its degree of accuracy in representing a corresponding runtime state of a given computing services platform.

In order to programmatically produce translation programs that are sufficiently accurate across homogeneous computing platforms and provide an adequate diversity of generated programs, various methodologies under the umbrella of 'Genetic Programming' may be used. However, the specific evolutionary programming methodologies used may vary depending on the particular implementation. Using methodologies of evolutionary programming on a domain of representational problems across heterogeneous computing services platforms, a set of self-evolving programs that implement a substantially "seamless", unified computing resources management solution across diverse computing services platforms may be provided, where such programs accommodate the evolution of those platforms automatically without requiring further engineering, or re-engineering.

As described herein, a service blueprint may be constructed as a directed acyclic graph that is composed of low-level abstractions (e.g., 'Functional Components', "Deployment Models", "Resource Sets", "Compute Resources", etc.) that may pertain to various aspects and dimensions of a set of virtually deployed computing services (e.g., software, a collection of identical VMs, Networks on which a given VM is provisioned, load balancers and/or firewalls behind which a VM resides, etc.) where the directionality between these elements represent the topological relationship between these aspects within the context of that set of resources (e.g., which software is hosted on which VM, how a collection of N VMs is distributed across firewalls, etc.). Accordingly, the structure of a service blueprint can be represented as a directed acyclic graph (DAG) G: $\{N_i, N_j, E_{ij}\}$, where $N_i$ and $N_j$ are two nodes representing the abstractions and $E_{ij}$ is a directed (and potentially weighted in terms of qualitative relationships) edge between these two nodes that represents their topological relationship within such a deployed instance of an associated computing service (e.g., where the computing service is provisioned from a normalized blueprint).

In one approach, to construct a useful and meaningful service blueprint from a given design template for a corresponding computing services platform, it may be desirable to have a translational program that introspects (examines) such a template and attempts to create a semantically equivalent service blueprint. However whether such a programmatically constructed service blueprint is indeed an accurate representation of the runtime state of the associated computing services platform may need to be verified by comparing the service blueprint with the operating behavior and/or internal configuration of the associated computing services platforms, such as by using an agent (such as agents 140 and 155 shown in FIG. 1) that resides on the particular computing services platform. As a practical matter, e.g., due to the diversity (e.g., current and future) of such platforms, such a translational program (or set of programs) may not anticipate or encompass all variations of design template semantics for a given platform, nor may it anticipate the evolution of such templates (e.g., emergence of new templates) or the evolution of any underlying semantics in such templates (e.g., resulting in modified or enriched templates).

In one example, it may be presumed that a number 'n' computing service platforms (C) are known: where $C_i$, i=1 . . . n. In such a situation, $M_i$ translational programs may exist for each $C_i$ (e.g., one program may not cover all the known template patterns) where $M_i=f(C_i)$. For instance, a total N number of such programs where $N=\Sigma f(C_i)$ (i=1 . . . n) may be available. In this example, each program may be referred to as $P_k$ (k=1 . . . N). In this particular example, these programs may share a "family" resemblance in their logical structure, e.g., they may all be decision trees. Accordingly, the programs may each be represented in memory (computer memory) by respective tree structures, such as in the logical form of the drawings shown in FIGS. 8A-8C.

A collection of nodes across a given set of decision trees for each Pk may constitute an initial (e.g., genetic) population of translation logic elements that may be utilized in accordance with the approaches described herein. In such approaches, by starting with that initial population of translation logic elements, and applying genetic operators, including reproduction, crossover and mutation, a viable set of programs can be produced (e.g., by evolving/growing a population of constituent translation logic elements and constructing new translation programs from the evolved population). In some implementations, the evolution of these programs may be controlled by multiple layers of fitness functions, such as described herein.

For instance, the evolution of such a set of translation programs may be controlled by validating those programs based on service blueprints that are produced by programs that are programmatically generated using the techniques described herein. For example, generated service blueprints for such programs may be evaluated using self-consistency validation, such as using the approach shown in FIG. 4. Using such self-consistency validation techniques, badly formed, and/or structurally inconsistent programs or populations of programs (e.g., and corresponding translation logic elements) may be automatically rejected and/or discarded. Further, the evolution of a set of translation programs may also be controlled using semantic consistency (accuracy) validation (also shown in FIG. 4). For instance, a set of rules could be applied to exclude programs that can, a priori, be identified as being semantically inconsistent with a computing services platform runtime state, regardless of the semantics used in associated design template.

Figure 5:
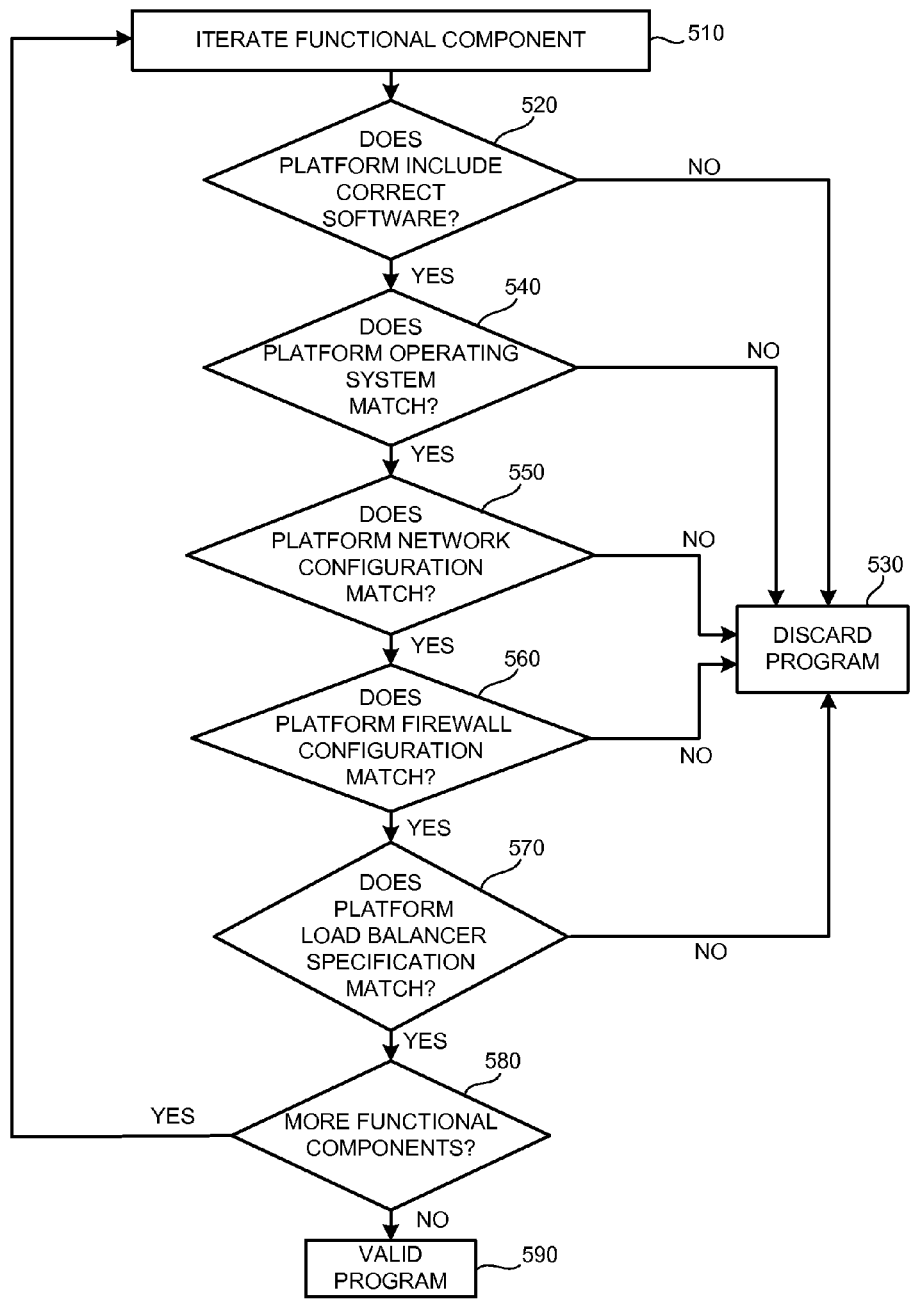
FIG. 5 is a flowchart illustrating a method for validating a service blueprint against a runtime state of an associated computing services platform according to an example implementation.

A population of translation programs may also be controlled using service blueprint evaluation functions (e.g., such as shown in FIG. 5), where such evaluation functions may be used to evaluate the results of executing such "genetically" evolved translation programs. This may be accomplished by comparing elements of a service blueprint generated by a given "evolved" program with an actual runtime state for a computing services platform that corresponds with a design template from which the service blueprint being evaluated was generated. If the service blueprint does not match (e.g., within a given degree of accuracy), the runtime state of the corresponding computing services platform, the generated (evolved) program (and/or its associated translation logic elements) may be discarded. The efficiency of such approaches may be further improved by using different iterative/stochastic optimization techniques.

A practical example for generating self-evolving design template translation programs to produce self-correcting (self-evolving) service blueprints for managing VMware vCloud Applications is now described. In this example, the process starts with a set of well-known vCloud vApp templates for which translation programs are written, where those translation programs are verified to generate accurate service blueprints for their respective design templates (and respective corresponding computing services platforms). These programs may work off the vCloud APIs in order to introspect (examine) the well-known templates and then create respective normalized service blueprint DAGs. These programs may be primarily composed of conditional statements, arithmetic and Boolean functions, control transfer statements and loops.

In this example, if there are N VirtualSystemCollection entries in the template, the process may start with N ResourceSet Nodes in a normalized service blueprint DAG. Further in this example, if all VMs in the VirtualSystemCollection host the same virtual machine disk format (VMDK), a 1:1 relationship between that VirtualSystemCollection and the constructed ResourceSet in the service blueprint may be preserved. Still further in this example, for each hosted VMDK, a FunctionalComponent Node in the normalized service blueprint DAG may be created. Additionally in this example, a 'hosted on' relationship Edge from the FunctionalComponent Node to the ResourceSet Node may be created. This process may be continued (e.g., iteratively continued) until the template is translated to a corresponding service blueprint.

The translation programs, in this example, may also be structurally composed of a function set (Operators), such as variable assignments, conditional statements, loop statements, calls to recursive subroutines, etc., and a terminal set (Operands), which operate as inputs, and, in this example, would be a normalized, introspected representations of their respective vApp templates. The product of such a program would be a normalized service blueprint. Thus, in this example, the template translation process may be represented as vApp Template−>Terminal Set+Function Set−>normalized Service Blueprint In this example, a decision tree including the function set and terminal set may be represented, in generic form, as a graph. It will be appreciated, however, that such a graph representation may be a virtual representation and may not directly corresponds with the actual memory structure of a runtime execution flow for a corresponding translation program. In this example, starting with a set of N diverse vApp template types and their corresponding translation programs that are verified to translate the N templates into corresponding normalized service blueprints, we have a set of N such graph structures of terminal sets and function sets.

Such terminal and function sets may act as an initial genetic population, Pi. The programs discussed above are all fully verified against the actual vApp instances provisioned based on the vApp templates, as the process is started with a priori knowledge of a well-established set of vApp template, and a full fitness rating is allocated to each of these programs.

Next, genetic operators may be applied to produce new generations of such terminal sets and function sets. Only applying crossover and mutation operators would not adequately grow the size of this population, so a reproduction mechanism may also be applied (e.g., by simply making a random number 'r' copies of a randomly chosen program Pr and adding the r copies back in a given generational population). For each generation of such programs, a fitness function (F1) may be applied to determine which translation programs or translation logic elements are viable candidates to be made eligible for further generational (genetic) evolution. Further, another set of fitness functions (F2) may be used to determine whether a new program in a given generation is a good enough fit for a particular set of design templates.

A first level fitness function (F1) may be expressed in terms of semantic validity and self-consistency of generated service blueprints. A second level of fitness functions (F2) may evaluate a degree of accuracy with which a generated translation program translates a previously unknown template into a normalized Service Blueprint. That accuracy can be measured by comparing a design time representation of the generated service blueprint with the runtime state information of a deployed computing services platform that corresponds with the previously unknown template. Further, the second fitness function, F2, may also contribute to termination criteria, in combination with other criterion, such as number of generations, relative divergence of viable programs between two consecutive generations, etc., e.g., in order to decide when to cease (or redirect) the process of evolving the population of translation programs and/or translation logic elements.

In example implementations, an approach for implementing self-evolving computing service template translation program may include starting with a well-understood set of design templates and constructing an initial set translation program population (population of translation logic elements) for those templates. The initial set of programs may include function sets and terminal sets that may translate a given design template into a normalized service blueprint. After the initial set of translation programs is constructed, a new type of design template may be encountered (e.g., discovered or identified). The new template may be an entirely new template or may be a template with new semantics, as two examples. In response to identifying the new template, genetic operators may be used to evolve the initial set of translation programs over many generations.

In an example approach, a population of template translation programs may be evolved by applying genetic operators to the initial set of translation programs (and/or constituent logic elements of those programs), as well as applying genetic operators to successive generations of the translation programs and/or constituent elements of those programs. For instance, crossover, mutation and reproduction may be performed. Applying crossover may include generating controlled, random combinations of structural elements (e.g., constituent translation logic elements) of two programs to yield new generations of function sets. Applying mutation may include stochastically producing small perturbations in translation logic elements that are generated as a result of crossover. Reproduction may include copying program (logic) structures into either a current, and/or a next generation of translation programs (and/or translation logic elements) in order to increase the population size.

In an example implementation, for each generation of translation programs (and/or translation logic elements), a first order fitness function (F1) may be applied to discard programs that are intrinsically unstable and/or programs that generate semantically inconsistent service blueprints, such as may be determined using the approaches described herein. In this example, after a certain number of generations have been produced, a second order of fitness functions (F2) may be applied. The second order of fitness functions, F2, may be utilized to identify valid programs that can convert newly detected types of vApp templates into corresponding normalized service blueprints, e.g., within a given degree of accuracy.

The fitness functions, F2, may be evaluated by performing a comparison of a design time state and a runtime state comparison technique, that may include comparing normalized service blueprint elements with a runtime state matrix of a corresponding computing services platform, for which the normalized service blueprint was generated (e.g., using the translation program being validated). The runtime state matrix for the computing services platform may be obtained using application program interfaces (APIs) of computing services implemented on the corresponding computing services platform, e.g., by observing operational behavior of the computing services platform, such as using the agents 140 and 155 shown in FIG. 1. The fitness function, F2, may establish validity of an evolved translation program within a certain degree of accuracy, e.g., such as to ensure that generational evolution is not temporally unbounded and that the translation program evolution process terminates well, and within a reasonable time period. There are, of course, various techniques that may be used to improve the fitness function and termination criteria.

For the fitness function, F2, of this example, a degree of accuracy of translation of a template to a normalized service blueprint by a given translation program may be expressed in terms of a fraction fM of mismatched constructs between elements of the normalized service blueprint and elements of a corresponding runtime state matrix for a corresponding computing services platform. In an example implementation, an ideal target of fM=0 (i.e., no mismatches) for the fitness function, F2, can be used as a starting point, where the fM target may be dynamically modified.

Termination criteria, e.g., for terminating evolution of a given population of translation programs and/or translation logic elements, may also be established. For example, a termination criterion may be expressed in terms of a maximum number of generations Pg that a given population is allowed to be evolve in order to produce a translation program that can accurately (e.g., in accordance with one or more fitness functions) translate a newly discovered design template to a corresponding service blueprint. As an additional, or alternative, termination criterion, a population of translation programs and/or translation logic elements may be evaluated to determine whether or not any substantially new genetic materials (e.g., translation programs and/or translation logic elements) are being introduced (produced) or whether the "genetic material" of successive generations is merely oscillating. The specific criteria used will, of course, depend on the particular implementation.

In such an approach, if such boundary (termination) conditions occur prior to reaching a target fM value, the translation logic (program) population may be randomized (e.g., in order to redirect the evolution). In an example implementation, if the number of generations for a given population of translation programs and/or translation logic element is approaching a limit Pg, but a fM value for a given evolved translation program is converging on a target fM value and is within an acceptable variance (e.g., 0.001) of the target fM value, the population may be accepted as including a sufficiently accurate translation program for translating the newly discovered template. Accordingly, in such implementations, termination criteria may be a set of varying matrices that are based on target fM values as well as an allowed number of generations Pg.

Once a valid, evolved program is identified, that program may be added to a set of verified blueprint generating (template translation) programs. Additionally, the genetic structure (constituent logic elements) of verified and added programs may also be added to the population of logic elements that are used for a next round of evolution, where such a next round of evolution may occur in response to additional new design templates being discovered.

At some point in such processes, such a newly detected template might contain additional network connectivity configurations between, for example, VMs in a VirtualSystemCollection or VMs across VirtualSystemCollection, and one, or many such programs, that are evolved after a number of generations, may be able to represent such a template accurately (e.g., within a given degree of accuracy) as a normalized service blueprint by creating the corresponding "Network Path" Edges between the VM Nodes within a degree of acceptable accuracy.

FIG. 1 is a block diagram illustrating a computing network 100 in which a translation program generator 115 is implemented according to an example implementation. As shown in FIG. 1, the translation program generator 115 may be included in a computing system 105 that also includes one or more processors 110 (hereafter "processor 110"). In an example implementation, the translation program generator 115 may be included (embodied) on a machine-readable storage medium, such as a non-transitory machine readable medium. The translation program generator 115 may include machine-readable instructions, as well as other machine-readable information, where the instructions, when executed by the processor 110 (e.g., in conjunction with additional machine readable information of the translation program generator 115), may provide for implementing techniques for self-evolving computing service design template translation, such as using the approaches described herein.

As illustrated in FIG. 1, the computing system 105 may be coupled with a computing network 120 (e.g., such as a private network or a public network). The computing system 105 may be configured to communicate with computing services platforms 125 and 145 via the network 120. As indicated in FIG. 1, additional computing services platforms may be coupled with the network 120 and configured to communicate with the computing system 105 via the network 120. It will be appreciated that the platforms 125 and 145 are given by way of example and for purpose of illustration, and that the specific arrangement and elements included in the network 100 will depend on the particular implementation.

In the network 100, the computing services platforms 125 and 145 may be configured to virtually provide computing services to one or more computing device users via the network 120. For instance, the platforms 125 and 145 may be configured to virtually provide computing services to the computing system 105, and/or to provide such computing services to other computing systems (not shown in FIG. 1). The respective computing services that are implemented or provided (or that may be implemented or provided) by each of the platforms 125 and 145 may be described (using meta-data) in respective templates 130 and 150 for each of the platforms 125 and 145. In an example implementation, the semantics of the meta-data for each of the templates 130 and 150 may be heterogeneous (e.g., specific to their respective computing services platform).

In the network 100, the translation program generator 115 may include translation programs (e.g., that are part of an initial population (set) of verified translation programs) that are configured to translate the templates 130 and 150 to respective normalized service blueprints, such those described herein. Alternatively, the translation program generator 115 may be configured to produce, using the techniques described herein, respective translation programs (e.g., by genetically evolving an initial set of translation programs) to translate the template 130 and or the template 150 to respective normalized service blueprints. In other instances, the translation program generator 115 may include a translation program, in an initial population of translation programs, that is configured to translate the template 130 and be configured to produce (by evolving the initial set of translation programs) a translation program to that is configured to translate the template 150, where the template 150 is discovered after the initial set of translation programs is constructed.

As illustrated in FIG. 1, each of the computing services platforms 125 and 145 also includes a respective agent, e.g., agents 140 and 155. In an example implementation, the agents 140 and 155 may be configured to observe runtime behavior, e.g., using APIs, of their respective computing services platform and provide those observations to the translation program generator 115. The translation program generator 115 may be configured to use the observations provided by the agents 140 and 150 to validate a given translation program (e.g., an evolved translation program) by comparing a normalized service blueprint generated by the given translation program with the observations of the runtime state of a corresponding computing services platform provided by its respective agent.

FIG. 2 is a block diagram illustrating further details of the translation program generator 115 of FIG. 1 according to an example implementation. It will be appreciated that the arrangement of the translation program generator 115 shown in FIG. 2 is given by way of example and for purposes of illustration, and the particular arrangement of the translation program generator 115 may depend on the particular implementation. For purposes of this disclosure, the translation program generator 115 illustrated in FIG. 2 will be described with further reference to FIG. 1, as appropriate. However, it will be appreciated that other configurations are possible.

As shown in FIG. 2, the translation program generator 115 may include a template repository 200, a template discovery module 205, a population manager 210, a translation program population 215, a population evolver 225, a semantic and consistency validator 230 and a platform validator 235. In other implementations, additional elements may be included in the translation program generator 115, elements of the translation program generator 115 may be eliminated, and/or the elements of the translation program generator 115 may be arranged in other fashions. For instance, the template repository 200 may be included in another entity, such as a database server that is operationally coupled with the computing system 105, or may be combined with the template discovery module 205. As another example, the population manager 210 and the population evolver 225 may be implemented as a single entity. Of course, a number of other arrangements for the translation program generator 115 are possible, and the particular arrangement of the translation program generator 115 shown in FIG. 2 illustrates one example approach.

Additionally, the interconnections (e.g., operational couplings) between the elements of the translation program generator as illustrated in FIG. 2 are given by way of example. Depending on the particular implementation, each of the elements of the translation program generator 115 may be configured to communicate with any of the other elements of the translation program generator 115, as appropriate. In the following discussion, communication between the various elements of the translation program generator 115 may be described, though a corresponding communication path between the specific elements involved in the communication is not explicitly shown in FIG. 2.

In the translation program generator 115 shown in FIG. 2, when implemented in the network 100, the template repository 200 may include the templates 130 and 140, where the templates 130 and 140 are either part of an initial set of design templates that correspond with an initial population of translation programs, or are computing services design templates that are discovered after the initial set of design templates and the corresponding initial population of translation programs are established. The template repository 200 may, of course, include other design templates for other computing services platforms, where each of the other design templates may, respectively, be part of the initial set of design templates, or may be discovered after the initial set of design templates is established.

The template discovery module 205 of the translation program generator 115 shown in FIG. 2 may be configured to discover new design templates that are not included in the template repository 200 (e.g., are not included in an initial set of design templates, or have not been previously discovered). In an example implementation, the template discovery module 205 may be configured to operate as a crawler that identifies, via the network 120, such new computing services design templates.

The template discovery module 205 may be configured, for instance, to identify new design templates by comparing design templates that it encounters, e.g., with a crawler, with design templates included in the template repository 200. A given design template may be designated as "new" if the template discovery module 205 determines that the given design template has not been previously encountered (e.g., corresponds with a new computing services platform) or if the given design template includes modified (e.g., enriched) semantics, as compared with a template that is already included in the template repository 200. As an example, such enriched semantics may include meta-data that corresponds with (describes) a newly implemented, or newly available computing service on one of the computing services platforms 125 or 145 (or other computing services platform), which may be reflected by changes in one of their respective templates 130 and 150.

In the translation program generator 115, the population manager 210 may operate in conjunction with the population evolver 225 to manage and grow (evolve) the translation program population 215, such as using the techniques described herein. The translation program population 215 may include translation programs (e.g., verified programs) that correctly translate at least one design template included in the template repository 200 to a normalized service blueprint for a corresponding computing services platform (e.g., such as the platforms 125 and 145. The programs included in the translation program population 215 may include programs that are part of an initial population of verified translation programs. The programs included in the translation program population 215 may also include programs that are generated by the translation program generator 115, such as by evolving the translation program population 215 (with the population evolver 225) and are verified to correctly translate (e.g., within a given degree of accuracy) at least one newly discovered template (e.g., a template this is encountered after an initial set of templates included in the template repository is established).

In certain implementations, the population manager 210 may be configured to analyzed a set of translation programs included in the translation program population (e.g., an initial set of programs or and evolved set of programs) and deconstruct those translation programs into a population of constituent translation logic elements 220 (e.g., constituent, or sub-decision trees). Such constituent elements, for purposes of this disclosure, are also referred to as structural elements of the individual translation programs included in the translation program population. The population evolver 225 may be configured to evolve (grow) the population of translation programs and/or the population of translation logic elements 220. For instance, the population evolver 225 may be configured to apply genetic operators (e.g., crossover, mutation and reproduction) to the translation program population 220 to evolve that population in order to generate new translation programs (or constituent logic elements) that are capable of correctly translating (e.g., in accordance with one or more fitness functions) newly discovered design templates into corresponding normalized service blueprints that represent respective runtime states of computing services platforms represented by the newly discovered templates. A process for generating such genetically evolved translation programs that may be implemented by the translation program generator 115 is illustrated in FIG. 3 and described in further detail below.

Figure 4:
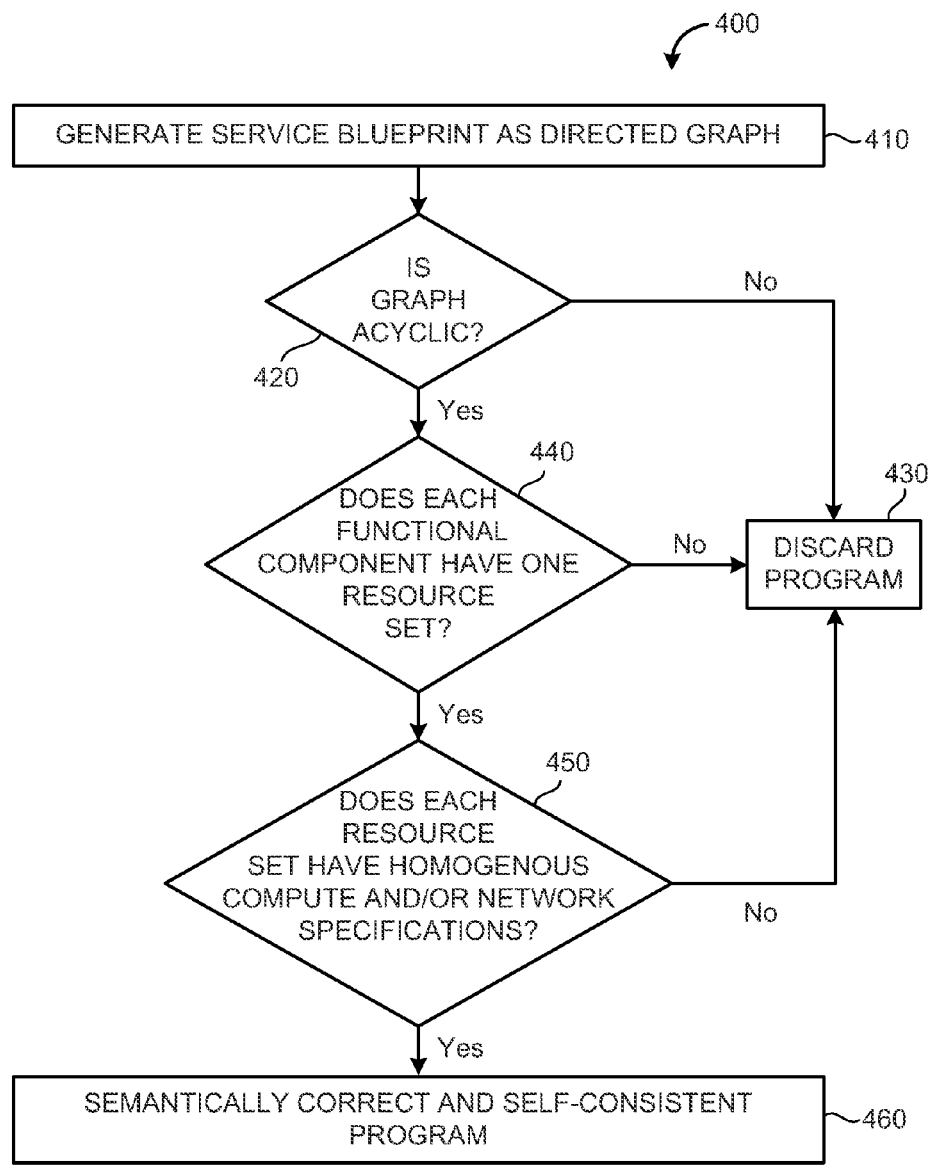
FIG. 4 is a flowchart illustrating a method for determining semantic accuracy and self-consistency of a service blueprint generated by a computing services template translation program according to an example implementation.

In the translation program generator 115, the semantics and consistency validator 230 and the platform validator 235 may be configured to validate genetically evolved translation programs, e.g., in order to determine their fitness for translating newly discovered design templates to normalized service blueprints. For instance, the semantics and consistency validator 230 may be configured to verify whether a normalized service blueprint that is generated by a genetically evolved translation program is semantically accurate and self-consistent. An example process that may be implemented by the semantics and consistency validator 230 is illustrated in FIG. 4 and described in further detail below. Further, the platform validator 235 of the translation program generator 115 may be configured to verify that a normalized service blueprint that is generated by a genetically evolved translation program accurately represents (e.g., within a given degree of accuracy) a runtime state of a corresponding computing services platform. An example process that may be implemented by the platform validator 235 is illustrated in FIG. 5 and described in further detail below.

Figure 3:
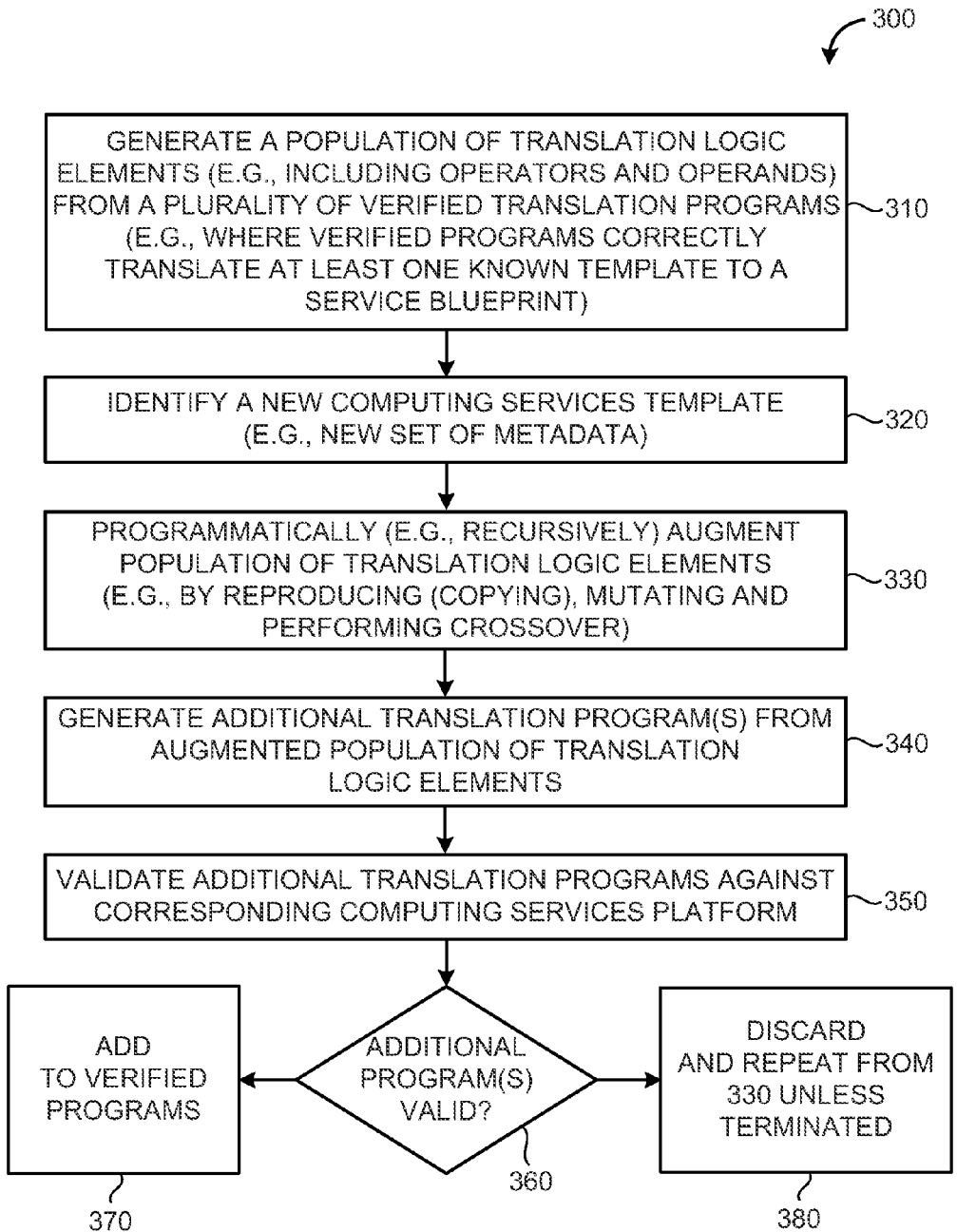
FIG. 3 is a flowchart illustrating a method for generating computing services template translation programs according to an example implementation.

FIG. 3 is a flowchart illustrating a method 300 for generating self-evolving computing services template translation programs according to an example implementation. The method 300 may be implemented in the network 100 illustrated in FIG. 1, where the translation program generator 115 of the network 100 is implemented as illustrated in FIG. 2. Accordingly, the method 300 will be described with further reference to FIGS. 1 and 2, as appropriate. It will be appreciated, however, that the method 300 may be implemented in networks having other configurations and/or or using translation program generators having other arrangements.

The method 300 includes, at block 310, generating a population of translation logic elements, such as by the population manager 210. The population of translation logic elements generated at block 310 may be an initial population of translation logic elements, or may be an evolved population of translation logic elements. Further, the population of translation logic elements generated at block 310 may include a plurality of verified translation programs (e.g., an initial plurality or an evolved plurality) and/or a plurality of constituent (structural) logic elements 220 of a set of verified translation programs that are generated by deconstructing a plurality of verified translation programs (e.g., an initial set of verified programs or an evolved set of verified programs). For instance, the population of translation logic elements generated at block 310 may include a plurality of decision trees (e.g., corresponding with respective translation programs and/or constituent elements of such translation programs) for translating design templates to corresponding normalized service blueprints.

Figure 8A:
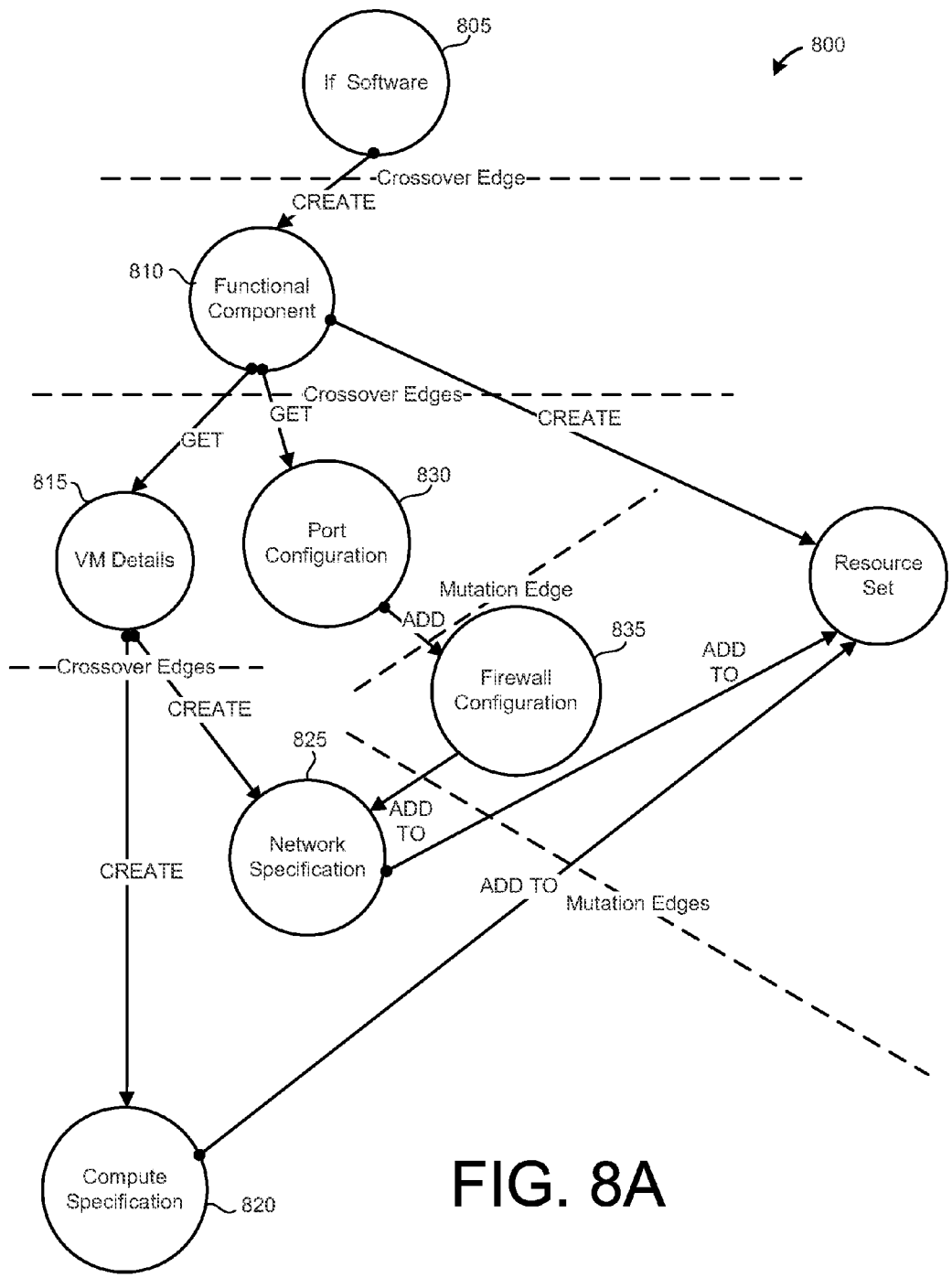
FIGS. 8A and 8B are diagrams illustrating translation logic elements that may be part of an initial population of translation logic elements according to an example implementation.
Figure 8B:
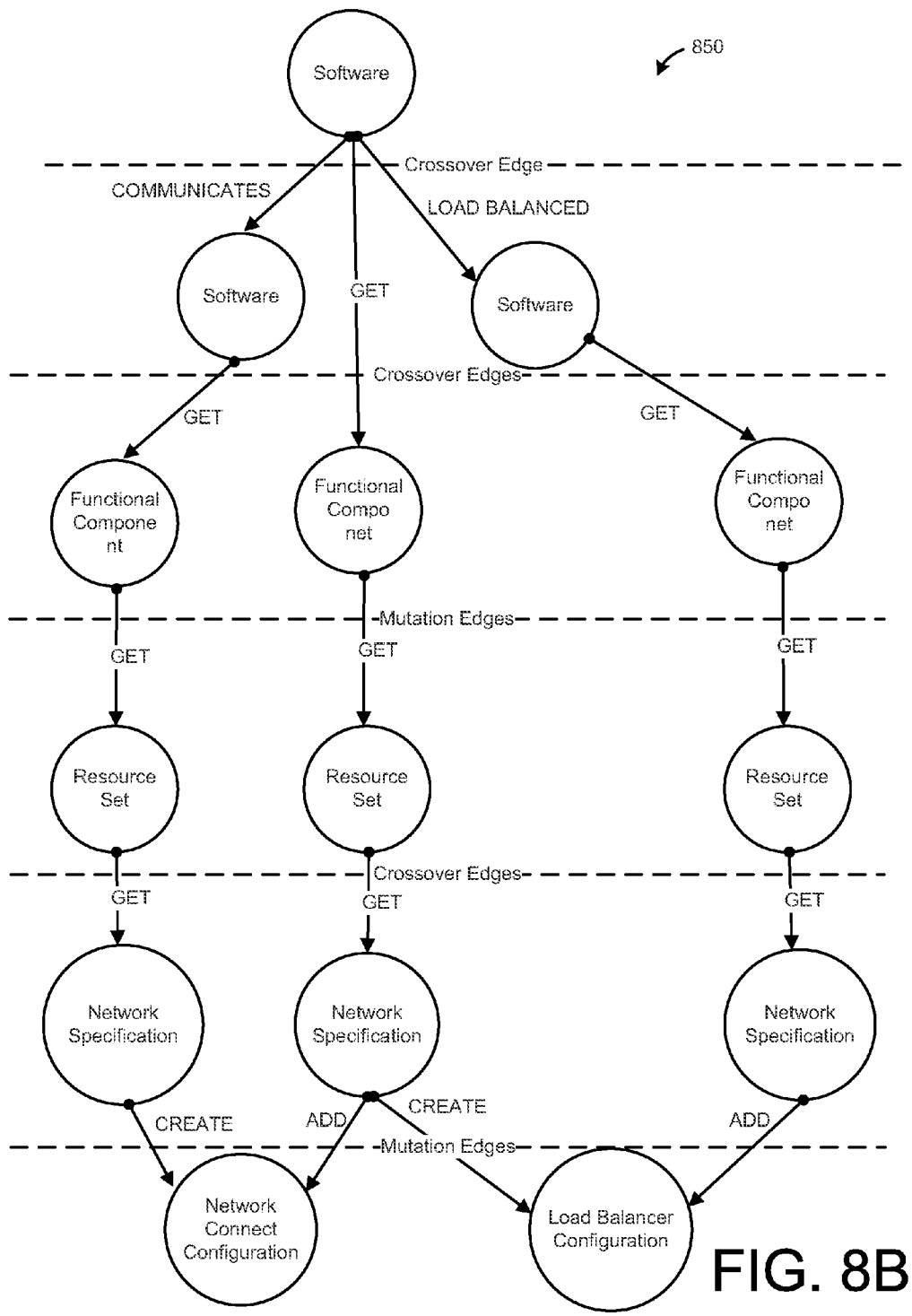

Examples of such decision trees are illustrated in FIGS. 8A and 8B and are discussed in further detail below. Briefly, however, each of the decision trees included in the plurality of translation logic elements generated block 310 may include a plurality of operators and a plurality of associated operands. For each decision tree, the operators may include a plurality of autonomous and sequential condition evaluation expressions and assignment expressions. Further, the operands of each decision tree may include a plurality of computing resource identifiers and service blueprint constructs. In example implementations, each of the resource identifiers may correspond with a respective computing services design template, while each of the service blueprint constructs is computing services design template independent (e.g., normalized).

The method 300 further includes, at block 320, identifying a new computing services design template, such as a template that is not included in the template repository 200 of the translation program generator 115 or a template with enriched semantics as compared with a previous version of the discovered template that is included in the template repository 200. As discussed herein, such new design templates may be identified by the template discovery module 205 using, for example, a crawler that may locate the new templates on various computing services platforms via the data network 120.

In response to the new template being identified at block 320, the method 300 may further include, at block 330, programmatically augmenting the population of translation logic elements generated at block 310. For instance, programmatically augmenting the population of translation logic elements may comprise applying genetic programming operators to the population of translation logic elements.

In an example implementation, programmatically augmenting the population of translation logic elements may comprise performing crossover between two or more of the translation logic elements included in a given generation. Programmatically augmenting the population of translation logic elements may further comprise performing mutation on one or more of the translation logic elements, such as by performing mutation of one or more elements for which crossover has been performed. Programmatically augmenting the population of translation logic elements may still further comprise performing reproduction of one or more translation elements of a given population, where performing reproduction comprises copying one or more of the translation logic elements of a given generation and adding the one or more copies to the population of translation logic elements of the given generation in order to increase the size of the population.

Such genetic operators, or other evolutionary programming operators, may be programmatically applied to a given population of translation logic elements (and/or translation programs), so as to grow and/or evolve the population of translation logic elements in order to produce an evolved population of translation logic elements that may be used to correctly translate the new design template, such as by constructing a new (additional) translation program from translation logic elements of the evolved population of translation logic elements, such as may be performed at block 340 of the method 300. In an example implementation, programmatically augmenting the population of translation logic elements may be performed recursively (or iteratively), so as to generate a number of successive generations of translation elements. The number of successive generations that are generated may depend on a number of factors, such as an initial size and/or diversity of a given generational population of translation logic elements and one or termination criteria, such as a threshold number of generations that are allowed in response to identifying the new design template at block 320. Additional termination criteria may also be applied, such as using one or more fitness functions to prevent unbounded evolution of the population translation logic elements, such as by using the example fitness functions described herein.

The method 300 still further includes, at block 350, validating one or more additional translation programs that are constructed, at block 340, from the evolved population of translation logic elements. For example, additional translation programs may be validated, at block 350, by evaluating service blueprints generated by those additional translation programs to ensure that the programs are semantically accurate and self-consistent, such as using the approach illustrated in FIG. 4. Validating the additional translation programs, at block 350, may further include, for additional programs that generate semantically accurate and self-consistent service blueprints, verifying that those service blueprints accurately represent (e.g., within a given degree of accuracy) a runtime state of a computing services platform that corresponds with a given generated service blueprint. For example, the approach illustrated in FIG. 5 may be used to verify that a given generated service blueprint "accurately" represents a runtime state of a computing services platform that corresponds with a design template from which the given generated service blueprint was generated (e.g., using an additional translation program generated at block 340).

At block 360, the method 300 includes determining, for each of the additional translation programs generated at block 340, whether or not the additional translation program was successfully validated at block 350. If a given additional translation program was successfully validated at block 360, the method 300 includes, at block 370, adding that additional translation program to the set (e.g., population) of verified translation programs, such as adding the validating additional translation program to the translation program population 215. If the given additional translation program is not successfully validated at block 360, the method 300 includes, at block 380, discarding the given additional program and returning to the block 330 to further evolve the population of translation logic elements, unless the process is terminated in accordance with one of one or more termination criteria. In an example implementation, if the method 300 is terminated based on a termination criterion, the population of translation logic elements (e.g., the translation program population 215) may be randomized and the method 300 may be resumed using the randomized population. Further, discarding additional translation programs that are not successfully validated may also include discarding associated (unvalidated) translation logic elements from which those additional translation programs were generated at block 340.

FIG. 4 is a flowchart illustrating a method 400 for determining semantic accuracy and self-consistency (e.g., applying a first fitness function) of a service blueprint that is generated by a computing services template translation program according to an example implementation. As was indicated above, the method 400 may be implemented at block 350 of the method 300 to, at least in part, validate additional translation programs that are generated, for example, at block 340 of the method 300. As with the method 300, the method 400 may be implemented in the network 100 illustrated in FIG. 1, where the translation program generator 115 of the network 100 is implemented as illustrated in FIG. 2. Accordingly, the method 400 will be described with further reference to FIGS. 1-3, as appropriate. It will be appreciated, however, that, as with the method 300, the method 400 may be implemented in networks having other configurations and/or or using translation program generators having other arrangements. In accordance with the techniques described herein, the method 400 may be applied, e.g., by the semantic and consistency validator 230 shown in FIG. 2, as a first fitness function for translation programs that are generated using the techniques described herein, such as by using the method 300.

In an example implementation, the method 400, when implemented in conjunction with the method 300, may be performed for each additional translation program that is generated at block 340 of the method 300. In such an approach, the method 400 includes, for each additional translation program, at block 410, generating a service blueprint (e.g., from the template identified at block 320) using the additional translation program, where the service blueprint of block 410 is generated as a directed graph.

At block 420, the method 400 includes, for the service blueprint generated at block 410, determining whether the service blueprint directed graph is acyclic. If the directed graph is not acyclic, the method 400 proceeds to block 430 and the additional translation program that was used to generate the service blueprint at block 410 may be discarded. In certain implementations, discarding the additional translation program may include discarding, at least a portion of, the constituent translation logic elements that were used to generate the additional translation program at block 340 of the method 300. Because such constituent logic elements produced a translation program that generated a service blueprint directed graph that was not acyclic, retaining such constituent translation logic elements may be undesirable, as such translation logic elements may adversely affect an evolving population of translation logic elements.

Figure 6:
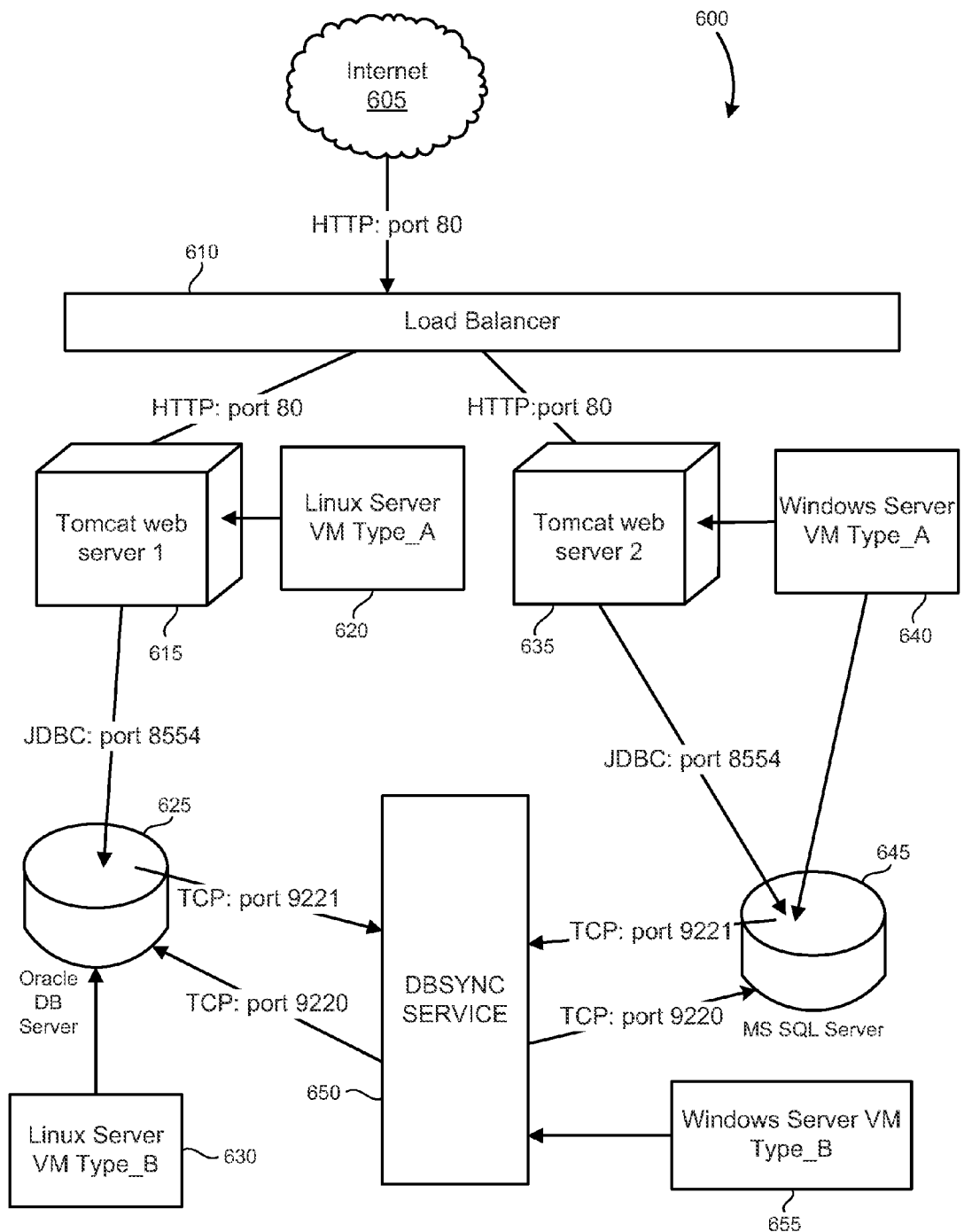
FIG. 6 is a diagram illustrating a design template of a computing services platform according to an example implementation.
Figure 7:
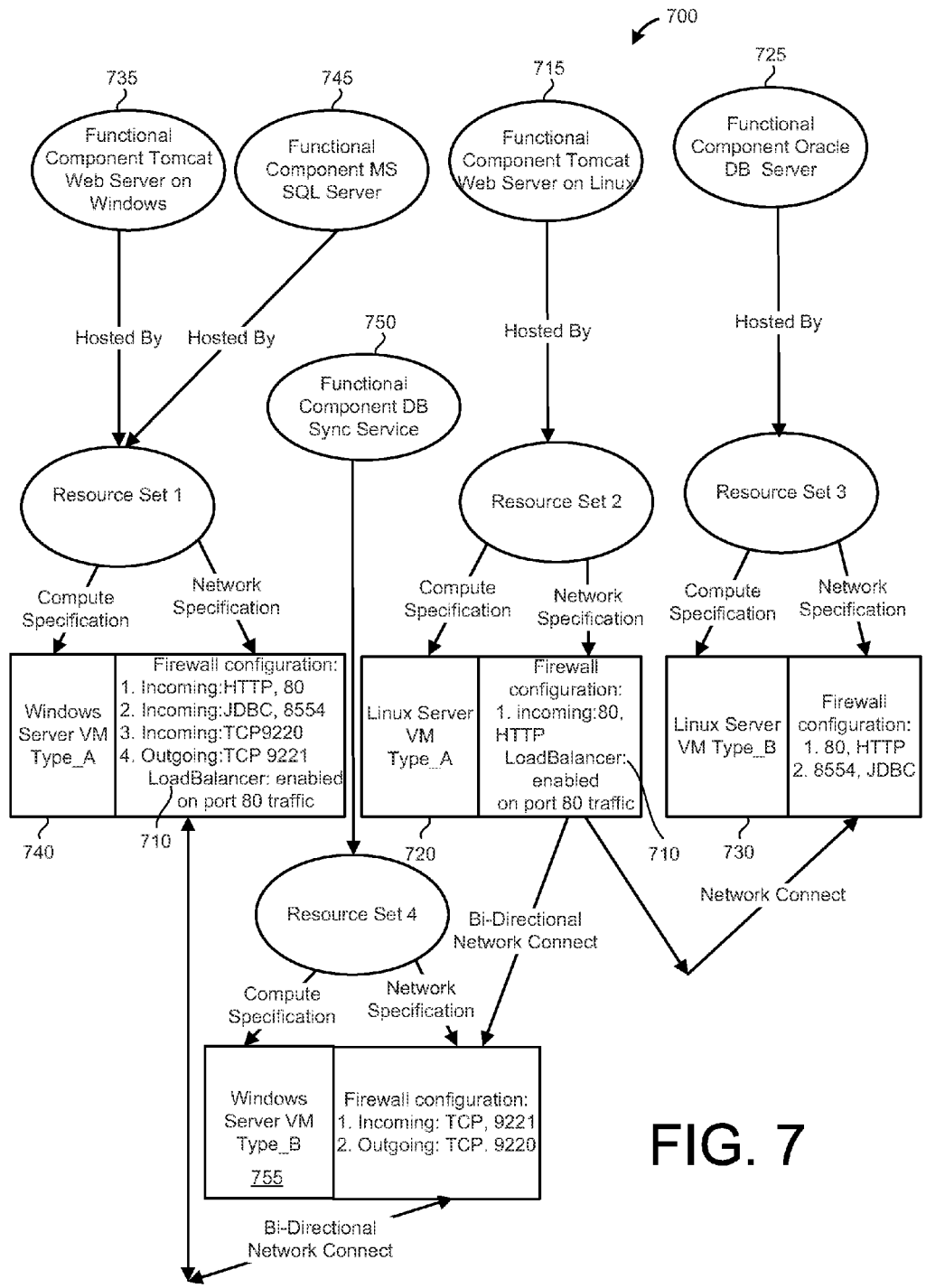
FIG. 7 is a diagram illustrating a service blueprint corresponding with the design template of FIG. 6 according to an example implementation.

If the service blueprint directed graph generated at block 410 is determined to be acyclic at block 420, the method 400 proceeds to block 440, where each functional component of the service blueprint is examined to ensure that only one resource set is associated with each of the functional components. Examples of functional components and associated resource sets that may be included in a service blueprint (e.g., representing elements of a design time state of a desired set of computing services) are illustrated in FIGS. 6 and 7 and discussed in further detail below. If it is determined, at block 440 that a functional component included in the service blueprint generated at block 410 has more than one resource set associated with it, or does not have a resource set associated with it, the method 400 proceeds to block 430 and the additional translation program that was used to generate the service blueprint at block 410 is discarded, which may, as discussed above, include discarding constituent translation logic elements that were used to generate the additional translation program at block 340 of the method 300.

If each functional component of the service blueprint generated at block 410 has one respective resource set associated with it, such as may be determined at block 440, the method 400 proceeds to block 450, where the method 400 includes determining whether each of those resource sets includes homogenous compute and network specifications. Examples of such compute and network specifications are also illustrated in FIGS. 6 and 7 and discussed in further detail below. Briefly, however, a resource set may be determined to not be homogeneous if that resource set includes a network specification that defines a given port as being open, while also defining the given port as being blocked. It will be appreciated that the operation of block 450 may include making such determinations for a number of functional components, each having a plurality of compute specification elements and a plurality of network specification elements that are examined to determine whether those specifications are homogenous. In certain implementations, the operations of blocks 440 and 450 of the method 400 may be implemented in a loop that is iterated for each functional component included in the service blueprint generated at block 410.

If it is determined, at block 450, that a resource set (either a compute specification and/or a network specification) for one of the functional components of the service blueprint generated at block 410 is not homogeneous, the additional translation program that was used to generate the service blueprint at block 410 is discarded, which may, as discussed above, include discarding constituent translation logic elements that were used to generate the additional translation program at block 340 of the method 300. If, however, it is determined, at block 450, that each of the resource sets for each of the functional components of the service blueprint generated at block 410 are homogeneous, the method 400 proceeds to block 460, where it is determined that service blueprint generated at block 410 is semantically correct and self-consistent. In this situation, further validation of the additional translation program used to generate the service blueprint at block 410 may be performed using the method 500 illustrated in FIG. 5.

FIG. 5 is a flowchart illustrating a method 500 for validating a service blueprint against a runtime state of an associated computing services platform according to an example implementation. As was indicated above, the method 500 may be implemented at block 350 of the method 300 to, at least in part, validate additional translation programs that are generated, for example, at block 340 of the method 300. As with the methods 300 and 400, the method 500 may be implemented in the network 100 illustrated in FIG. 1, where the translation program generator 115 of the network 100 is implemented as illustrated in FIG. 2. Accordingly, the method 500 will be described with further reference to FIGS. 1-4, as appropriate. It will be appreciated, however, that, as with the methods 300 and 400, the method 500 may be implemented in networks having other configurations and/or or using translation program generators having other arrangements. In accordance with the techniques described herein, the method 500 may be applied, e.g., by the platform validator 235 shown in FIG. 2, as a second fitness function (or set of fitness functions) for translation programs that are generated using the techniques described herein, such as by using the method 300.

In an example implementation, the method 500, when implemented in conjunction with the methods 300 and 400, may be performed for each additional translation program generated at block 340 that generates, as determined by the method 400, a semantically accurate and self-consistent service blueprint at block 410 of the method 400. The method 500 may also be implemented using information received, or obtained from an agent, such as the agents 140 and 155 shown in FIG. 1. In such an approach, the agent may provide information (e.g., to the platform validator 235 of the translation program generator 115) regarding a runtime state of a computing services platform that corresponds with a newly identified design template, such as the template identified at block 320 of the method 300. The platform validator 235 may then compare the information received from the agent with a given service blueprint that is generated at block 410 of the method 400 to determine whether the given service blueprint accurately represents the runtime state of the corresponding computing services platform.

A determination that is made, using the method 500, whether the service blueprint accurately represents the corresponding runtime state may be based on a second fitness function, or set of fitness functions. For example, a target fM value may be used, as was discussed above, where the target fM value represents a percentage of allowable mismatched constructs in the generated service blueprint when compared with the runtime state of the corresponding computing services platform for which the service blueprint was generated.

In some implementations, an accuracy determination that is made using the method 500 may also be based on a number of generations of a translation logic element population that have been generated in response to identifying a new template (e.g., at block 320 of the method 300), such as in like fashion as was discussed above. For instance, in an example, approach, if a threshold number of generations has been exceeded, the evolutionary process for a corresponding population of translation logic elements may be terminated and/or redirected. In some implementations, if the threshold number of population generations is being approached and a determined fM is converging on the fM target value (e.g., within a specified variance), it may be determined that the generated service blueprint is a sufficiently accurate representation of the runtime state of the corresponding computing services platform. In such approaches, the values used for an fM target value and/or a threshold value for an allowed number of generations will vary depending on the particular implementation. Of course, fitness functions other than those described herein may be applied as part of the method 500.

For purposes of clarity, the evaluation of a specific fitness function (or set of fitness functions) is not explicitly shown in FIG. 5. It will be appreciated, however, that the evaluation of such fitness functions may be implemented as part of the method 500. For instance, at each operation of the method 500, a number of mismatched constructs and number of total constructs examined may be determined in order to calculate an fM value. Further, a threshold number of generations may be taken into account, such as in the fashions described herein, when implementing the method 500.

As illustrated in FIG. 5, the method 500 is implemented by iterating through each functional component represented in a generated service blueprint and comparing the attributes of those functional components with a runtime state (e.g., based on information received from an agent) of a corresponding computing services platform. At block 510, the method includes iterating the functional component being examined in a generated service blueprint. In a first pass, the operation at block 510 may include selecting a first functional component of a generated service blueprint that is being examined.

From block 510, the method 500 proceeds to block 520, where it is determined whether any software that is associated with the functional component matches software of a corresponding functional component in the associated computing services platform. If the software for the current functional component indicated in the service blueprint does not match (within an acceptable degree of accuracy) software indicated by runtime state information for the computing services platform, the method 500 may proceed to block 530, and the additional translation program (e.g., such as generated at bock 340 of the method 300) may be discarded. Discarding the additional translational program at block 530, in like fashion as discussed above with respect to block 430 of the method 400, may include discarding constituent translation logic elements that were used to generate the additional translation program at block 340 of the method 300.

If it is determined, at block 520, that software indicated for the current functional component in the generated service blueprint matches software indicated in runtime state information for that functional component with acceptable accuracy, the method 500 proceeds to block 540. In the method 500, comparisons are made, at blocks 540-570, between additional various aspects (as applicable) of a current functional component indicated in the generated service blueprint with runtime state information for that functional component (such as received from an agent). If these comparisons match (e.g., within an acceptable degree of accuracy), the method 500 proceeds to the next comparison block. If a specific comparison does not match (e.g., within the given degree of accuracy), the method 500 proceeds to block 530, where the additional translation program (e.g., such as generated at bock 340 of the method 300) and/or constituent translation logic element that were used to generate the additional translation program may be discarded, such as in like fashion as previously described. It will be appreciated that the comparisons of blocks 520 and 540-570 may not applicable for every functional component represented in a generated service blueprint and only those comparisons that are appropriated for a given function component may be made. In other situations, comparisons other than those illustrated in FIG. 5 may be made.

For the method 500 shown in FIG. 5, the comparisons of blocks 540-570 include comparing operating system information (block 540), comparing network configuration information (block 550), comparing firewall configuration information (block 560) and comparing load balancer specification information (block 570). If each of these comparisons (e.g., between the generated service blueprint and corresponding runtime state information) matches (with sufficient accuracy), the method 500 proceeds to block 580, where the method 500 includes determining whether additional, unexamined functional components are represented in the generated service blueprint.

If there are additional, unexamined function components at block 580, the method 500 returns to block 510 and the operations of the method 500 are repeated for a next functional component of the service blueprint being examined. If, at block 580, there are no additional, unexamined functional components, the method 500 proceeds to block 590 and the additional translation program that generated the service blueprint for the newly identified design template is determined to be valid, such as in like fashion as at block 360 of the method 300. In this situation, the additional translation program being validated may then be added to the population of verified translation programs 215 (e.g., as well as its constituent logic elements being added to the logic elements 220), such as at block 370 of the method 300.

FIG. 6 is a diagram illustrating a design template 600 representing a design time state of a computing services platform according to an example implementation. While the design template 600 is shown, for purposes of illustration, in diagram form in FIG. 6, it will be appreciated that the design template 600 may take other forms. For instance, the design template 600 may be represented using meta-data that describes the arrangement of an associated computing services platform, or a desired arrangement. FIG. 7 is a diagram illustrating a service blueprint 700 that corresponds with the design template 600 of FIG. 6 according to an example implementation. The service blueprint 700 may be generated, for example, by a translation program that is produced using the techniques described herein, such as those described with the respect to FIGS. 1-5, for example. For purposes of brevity and clarity, the design template 600 and the service blueprint 700 will discussed in conjunction with one another, so as to clearly indicate the relationship between them.

In FIG. 7, elements that correspond with elements shown in FIG. 6 are referenced with like 700 series reference numbers. For purposes of brevity and clarity, the entirety of the specific details of each of the elements of the template 600 and the corresponding service blueprint 700 are not described herein. However, illustrative examples are described in order to provide an understanding of the relationship between the template 600 and the corresponding service blueprint 700.

Referring first to FIG. 6, the design template 600 represents a design time state of a set of computing resources, such as for a given network-based (cloud) computing platform. Accordingly, the computing resources represented in the template 600 are shown as being accessible through the Internet 605. As shown in FIG. 6, the template 600 includes a load balancer 610 that communicates, both inbound and outbound, via HTTP: port 80. In the service blueprint 700, the configuration of the load balancer 610 may be translated as load balancer configuration details 710, which may be included, as appropriate, in respective network specifications for VMs that are in communication with the load balancer 610. For example, the load balancer 610 is shown in FIG. 6 as being coupled with a Web server 615 and a Web server 635. In FIG. 7, the Web server 615 is represented by functional component 715 and the Web server 635 is represented by a functional component 735. As may be seen in FIG. 7, the load balancer configuration details 710 are listed in respective network specifications (as part of respective resource sets) for each of the Web server functional components 715 and 735.

The template 600 further includes an Oracle database (DB) server 625 that is represented in the service blueprint by functional component 725; a Microsoft SQL (MS SQL) server 645 that is represented by the functional component 745; and a DB sync service 650 that is represented in the service template 700 by the functional component 750. In the template 600, the Web server 615 is shown as being implemented on a Linux server 620 (compute specification element 720 in the service blueprint 700); the Web server 635 and the MS SQL server 645 are shown as being implemented on a Windows server 640 (compute specification element 740 in the service blueprint 700); the Oracle DB server 625 is shown as being implemented on a Linux server 630 (compute specification element 730 in the service blueprint 700); and the DB sync service 650 is shown as being implemented by a Windows server 655 (compute specification element 755 in the service blueprint 700).

Referring further to FIG. 6, various ports are defined for communication between the various computing resources represented in the template 600. Comparing FIG. 6 with FIG. 7 demonstrates that the port indications shown in the template 600 are translated (e.g., by a translation program) as part of respective network specifications for the various functional components of the service blueprint. Accordingly, each functional component of the service template 700 is associated with a resource set (where multiple functional components may share a resource set). Further, each resource set of the template includes a compute specification and a network specification that describes the arrangement of the elements of the template 600 in normalized blueprint constructs.

Figure 8C:
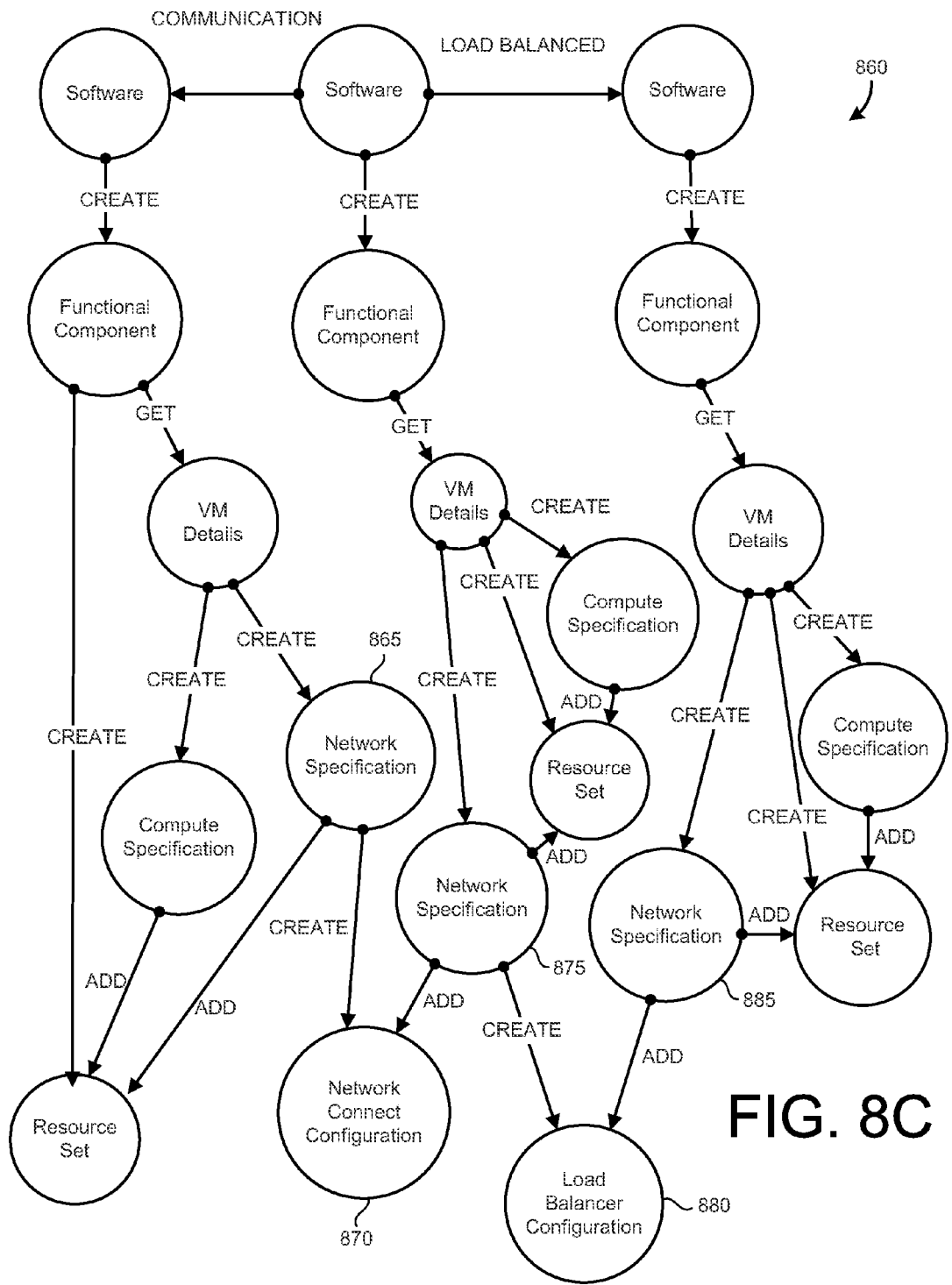
FIG. 8C is a diagram illustrating a translation logic element that may be generated by evolving, over a number of generations, a population of translation logic elements that includes the translation logic elements of FIGS. 8A and 8B according to an example implementation.

FIGS. 8A and 8B are diagrams illustrating translation logic elements 800 and 850 that may be part of an initial population of translation logic elements according to an example implementation. FIG. 8C is a diagram illustrating a translation logic element 860 that may be generated by evolving, over a number of generations, a population of translation logic elements that includes the translation logic elements of FIGS. 8A and 8B according to an example implementation. Each of the translation logic elements 800, 850 and 860 is represented as a decision tree, where the logic represented in those decisions trees may be used to translate a given design template (or portion of a design template) to a corresponding normalized service blueprint. In an example implementation, the translation logic elements 800 and 850 may be generated by deconstructing a set of verified translation programs, such as described herein. The translation logic element 860 may then be generated by programmatically augmenting (evolving), over a number of generations, a population of translation logic elements that includes the translation logic elements 800 and 850.

For purpose of brevity, each of the elements in the translation logic elements 800, 850 and 860 is not discussed in detail here. The following discussion, however, describes illustrative examples of the elements and aspects of the translation logic elements 800, 850 and 860 in order to provide an understanding of how a population of translation logic elements that includes the translation logic elements 800 and 850 may, using the approaches described herein, be evolved to produce the logic element 860.

In like fashion as discussed above, each of the translation logic elements 800, 850 and 860 is represented by a plurality of operators and a plurality of operands. Referring, for example, to FIG. 8A, the operators of translation logic element 800 include IF, CREATE, GET and ADD TO operators. The IF operator is illustrated by the IF Software 805 element of the translation logic element 800. The other operators are illustrated as operating at various crossover edges and mutation edges of the translation logic element 800.

Crossover edges indicate aspects of the translation logic element 800 (and the translation logic element 850) that are appropriate for applying a crossover genetic operator, such as in the manners described herein. For instance, crossover may be performed between the translation logic elements 800 and 850 at one or more of their crossover edges, where aspects of the two translation logic elements are combined to create a new, evolved translation logic element. Likewise, mutation edges indicate aspects of the translation logic element 800 (and the translation logic element 850) that are appropriate for applying a mutation genetic operator. For instance, a mutation operator may be applied at a mutation edge to connect an element of the translation logic element 800 (or the translation logic element 850) with a different element (e.g., at a corresponding mutation edge of the other element).

In the translation logic element 800, the operands include a functional component 810, VM details 815, a compute specification 820, a network specification 825, a port configuration 830 and a firewall configuration 835. The translation logic element 800 also includes a resource set operand. The translation logic element 850, in similar fashion as the translation logic element 800, includes a decision tree that includes a plurality of operators and operands with various crossover and mutation edges.

As was indicated above, the translation logic element 860 illustrated in FIG. 8C may be produced, using the techniques described herein, by evolving a population of translation logic elements that includes the translation logic elements 800 and 850 over a number of generations, such as by iteratively and/or recursively using genetic operators, such as in the manners describe herein. For instance, the particular arrangement, in the translation logic element 860, of network specification 865, network connect configuration 870, network specification 875, load balancer configuration 880 and network specification 885 (and the associated operators) is not present in either of the translation logic elements 800 or 850. However, by evolving a population of translation logic elements that includes the translation logic elements 800 and 850 over a number of generations, the particular arrangement of elements in the translation logic element 860 discussed above may be produced. The translation logic element 860 may then be used to accurately translate a newly discovered design template that includes such an arrangement of computing resources.

Implementations of the various techniques described herein may be implemented in digital electronic circuitry, or in computer hardware, firmware, software, or in combinations of them. Implementations may implemented as a computer program product, i.e., a non-transitory computer program tangibly embodied in an information carrier, e.g., in a machine-readable storage device (e.g., a computer-readable medium, a tangible computer-readable medium), for processing by, or to control the operation of, data processing apparatus, e.g., a programmable processor, a computer, or multiple computers. In some implementations, a non-transitory tangible computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communications network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) display device, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A computer-implemented method including executing, by at least one processor, instructions recorded on a non-transitory computer-readable storage medium, the method comprising:

generating, by the at least one processor, a population of translation logic elements from a plurality of verified computing services template translation programs, wherein each of the verified computing services template translation programs is configured to correctly translate at least one computing services template of a plurality of known computing services templates to a respective service blueprint;

identifying a new computing services template;

programmatically augmenting the population of translation logic elements;

copying one or more of the population logic elements and adding the one or more copies to the population of the translation logic elements;

performing mutation of one more of the translation logic elements of the population of translation logic elements; and performing crossover between two or more of the translation logic elements of the population of translation logic elements;

generating one or more additional computing services template translation programs based on the augmented population of translation logic elements;

validating each of the one or more additional computing services template translation programs; and based on the validating, performing, for each of the one or more additional computing services template translation programs, one of adding the additional translation program to the plurality of verified computing services template translation programs or discarding the additional translation program.

2. The computer-implemented method of claim 1, wherein generating the population of translation logic elements comprises:

deconstructing the plurality of verified translation programs into a plurality of constituent decision trees, wherein each decision tree includes a plurality of operators and a corresponding plurality of operands.

3. The computer-implemented method of claim 2, wherein:

the plurality of operators comprises a plurality of autonomous and sequential condition evaluation expressions and assignment expressions; and the plurality of operands comprises a plurality of resource identifiers and blueprint constructs.

4. The computer-implemented method of claim 3, wherein:

each of the resource identifiers corresponds with a respective computing services template; and each of the blueprint constructs is computing services template independent.

5. The computer-implemented method of claim 1, wherein programmatically augmenting the population of translation logic elements comprises recursively augmenting the population of translation logic elements.

6. The computer-implemented method of claim 1, wherein validating each of the one or more additional computing services template translation programs comprises, for each of the additional computing services template translation programs, determining whether a service blueprint for the new computing services template generated by the respective additional translation program is semantically accurate and self-consistent, wherein if the generated service blueprint is not semantically accurate and self-consistent, the respective additional translation program is discarded.

7. The computer-implemented method of claim 6, wherein:
the generated service blueprint comprises a directed graph; and
determining whether the generated service blueprint is semantically accurate and self-consistent comprises:
determining if the directed graph is acyclic;
determining, for each of one or more functional components represented in the directed graph, whether the respective functional component is associated with a single computing resource set, each respective computing resource set including at least one of respective computing specifications and respective network specifications; and
determining whether each of the at least one of respective computing specifications and respective network specifications are homogeneous.

8. The computer-implemented method of claim 6, wherein validating each of the one or more additional computing services template translation programs further comprises, for each semantically accurate and self-consistent service blueprint generated, determining whether the generated service blueprint corresponds, within a given degree of accuracy, with a runtime state of a computing services platform associated with the new computing services template, wherein:
in the event the generated blueprint corresponds with the runtime state within the given degree of accuracy, the respective additional translation program is added to the plurality of verified computing services template translation programs; and
in the event the generated blueprint does not correspond with the runtime state within the given degree of accuracy, the respective additional translation program is discarded.

9. The computer-implemented method of claim 1, wherein validating each of the one or more additional computing services template translation programs comprises, for each of the additional computing services template translation programs, determining whether a service blueprint for the new computing services template generated by the respective additional translation program corresponds, within a given degree of accuracy, with a runtime state of a computing services platform associated with the new computing services template, wherein:
in the event the generated blueprint corresponds with the runtime state within the given degree of accuracy, the respective additional translation program is added to the plurality of verified computing services template translation programs; and
in the event the generated blueprint does not correspond with the runtime state within the given degree of accuracy, the respective additional translation program is discarded.

10. The computer-implemented method of claim 9, wherein:
the generated service blueprint comprises a directed graph; and
determining whether the generated blueprint corresponds with the runtime state within the given degree of accuracy comprises:
for each of one or more functional components represented in the directed graph, performing one or more of:
comparing software of a corresponding functional component on the computing services platform with software indicated in the directed graph;
comparing an operating system of the corresponding functional component on the computing services platform with an operating system indicated in the directed graph;
comparing a network configuration of the corresponding functional component on the computing services platform with a network configuration indicated in the directed graph;
comparing a firewall configuration of the corresponding functional component on the computing services platform with a firewall configuration indicated in the directed graph; and
comparing a load balancer specification of the corresponding functional component on the computing services platform with a load balancer specification indicated in the directed graph; and
determining a percentage of attributes of the computing services platform that correctly match attributes indicated in the directed graph based on the comparisons of the computing services platform with the directed graph for each functional component indicated in the directed graph.

11. The computer-implemented method of claim 1, further comprises, in the event each of the one or more additional translation programs are discarded:
programmatically further augmenting the population of translation logic elements;
generating one or more further additional computing services template translation programs based on the further augmented population of translation logic elements;
validating each of the one or more further additional computing services template translation programs; and
based on the validating of the one or more further additional computing services template translation program, performing, for each of the one or more further additional computing services template translation programs, one of adding the further additional translation program to the plurality of verified computing services template translation programs or discarding the further additional translation program.

12. The computer-implemented method of claim 1, wherein each of the known computing services templates and the new computing services template comprises respective meta-data describing a configuration for a corresponding computing services platform.

13. The computer-implemented method of claim 1, wherein the new computing services template comprises one of a modified version of one of the known computing services templates and a computing services template not included in the known service templates.

14. The computer-implemented method of claim 1, wherein the respective service blueprint comprises a normalized directed acyclic graph representing a design time state of a computing services platform associated with the respective computing services template, the directed acyclic graph including a plurality of nodes and corresponding edges that define respective relationships between the plurality nodes.

15. The computer-implemented method of claim 1, wherein programmatically augmenting the population of translation logic elements, generating the one or more additional computing services template translation programs and validating each of the one or more additional computing services translation programs are performed in accordance with one or more termination criteria.

16. A computer program product, the computer program product being tangibly embodied on a non-transitory computer-readable storage medium storing instructions that when executed cause a processor to perform a process, the instructions comprising instructions to:
   generate, by the at least one processor, a population of translation logic elements from a plurality of verified computing services template translation programs, wherein each of the verified computing services template translation programs is configured to correctly translate at least one computing services template of a plurality of known computing services templates to a respective service blueprint;
   identify a new computing services template;
   programmatically augment the population of translation logic elements comprising:
      copying one or more of the translation logic elements and adding the one or more copies to the population of the translation logic elements;
      performing mutation of one or more of the translation logic elements of the population of translation logic elements; and
      performing crossover between two or more of the translation logic elements of the population of translation logic elements;
   generate one or more additional computing services translation programs based on the augmented population of translation logic elements;
   validate each of the one or more additional computing services translation programs; and
   based on the validating, perform, for each of the one or more additional computing services translation programs, one of adding the additional translation program to the plurality of verified computing services translation programs or discarding the additional translation program.

17. The non-transitory computer-readable storage medium of claim 16, wherein the instructions to programmatically augment the population of translation logic element comprise instructions to recursively augment the population of translation logic elements.

18. The non-transitory computer-readable storage medium of claim 16, further comprising, in the event each of the one or more additional translation programs are discarded, instructions to:
   programmatically further augment the population of translation logic elements;
   generate one or more further additional computing services template translation programs based on the further augmented population of translation logic elements;
   validate each of the one or more further additional computing services template translation programs; and
   based on the validating of the one or more further additional computing services template translation program, perform, for each of the one or more further additional computing services template translation programs, one of adding the further additional translation program to the plurality of verified computing services template translation programs or discarding the additional translation program.

19. A system comprising;
   at least one memory device configured to store executable code; and
   at least one processor operably coupled to the at least one memory device, the processor configured to execute the code in order to perform the operations of:
      generating, by the at least one processor, a population of translation logic elements from a plurality of verified computing services template translation programs, wherein each of the verified computing services template translation programs is configured to correctly translate at least one computing services template of a plurality of known computing services templates to a respective service blueprint;
      identifying a new computing services template;
      programmatically augmenting the population of translation logic elements by:
         copying one or more of the translation logic elements and adding the one or more copies to the population of the translation logic elements;
         performing mutation of one or more of the translation logic elements of the population of translation logic elements; and
         performing crossover between two or more of the translation logic elements of the population of translation logic elements;
      generating one or more additional computing services template translation programs based on the augmented population of translation logic elements;
      validating each of the one or more additional computing services template translation programs; and
      based on the validating, performing, for each of the one or more additional computing services template translation programs, one of adding the additional translation program to the plurality of verified computing services template translation programs or discarding the additional translation program.

20. The system of claim 19, wherein the operation of validating each of the one or more additional computing services template translation programs comprises:
   for each of the additional computing services template translation programs, determining whether a service blueprint for the new computing services template generated by the respective additional translation program is semantically accurate and self-consistent, wherein if the generated service blueprint is not semantically accurate and self-consistent, the respective additional translation program is discarded; and
   for each semantically accurate and self-consistent service blueprint generated, determining whether the generated service blueprint corresponds, within a given degree of accuracy, with a runtime state of a computing services platform associated with the new computing services template, wherein:
      in the event the generated blueprint corresponds with the runtime state within the given degree of accuracy, the respective additional translation program is added to the plurality of verified computing services template translation programs; and
      in the event the generated blueprint does not correspond with the runtime state within the given degree of accuracy, the respective additional translation program is discarded.

* * * * *

UNITED STATES PATENT AND TRADEMARK OFFICE
CERTIFICATE OF CORRECTION

PATENT NO. : 8,789,022 B2  
APPLICATION NO. : 13/443875  
DATED : July 22, 2014  
INVENTOR(S) : Atanu Neogi Page 1 of 1

It is certified that error appears in the above-identified patent and that said Letters Patent is hereby corrected as shown below:

On the Title Page

Item (56), in column 2, under "Other Publications", line 1, delete "Choreogrphics" and insert -- Choreographics --, therefor.

In the Claims

In column 26, line 29, in claim 1, delete "elements;" and insert -- elements comprising: --, therefor.

In column 26, line 30, in claim 1, delete "population" and insert -- translation --, therefor.

In column 26, line 33, in claim 1, after "one" insert -- or --.

In column 30, line 4, in claim 19, delete "comprising;" and insert -- comprising: --, therefor.

Signed and Sealed this  
Seventh Day of October, 2014

Michelle K. Lee  
*Deputy Director of the United States Patent and Trademark Office*